(12) United States Patent
Callaci

(10) Patent No.: US 7,414,646 B2
(45) Date of Patent: Aug. 19, 2008

(54) METHOD AND APPARATUS FOR VIDEO COMMUNICATION OVER A LIMITED BANDWIDTH MEDIUM

(75) Inventor: John W. Callaci, Diamond Bar, CA (US)

(73) Assignee: JPS International, Inc., Las Vegas, NV (US)

( * ) Notice: Subject to any disclaimer, the term of this patent is extended or adjusted under 35 U.S.C. 154(b) by 60 days.

(21) Appl. No.: 10/789,437

(22) Filed: Feb. 26, 2004

(65) Prior Publication Data

US 2004/0223050 A1    Nov. 11, 2004

Related U.S. Application Data

(63) Continuation-in-part of application No. 09/927,132, filed on Aug. 10, 2001, now Pat. No. 6,700,601.

(60) Provisional application No. 60/224,254, filed on Aug. 10, 2000.

(51) Int. Cl.
   *H04N 7/14* (2006.01)
(52) U.S. Cl. .................................. 348/14.12
(58) Field of Classification Search ... 348/14.01–14.14, 348/384.1, 390.1, 401.1, 438.1, 439.1, 412.1, 348/413.1, 415.1, 416.1, 699; 382/236, 194
   See application file for complete search history.

(56) References Cited

U.S. PATENT DOCUMENTS

| 4,710,809 | A | * | 12/1987 | Ries et al. ................. 348/384.1 |
| 5,506,624 | A | | 4/1996 | Moreton |
| 5,835,147 | A | | 11/1998 | Florentin et al. |
| 5,969,772 | A | * | 10/1999 | Saeki ........................ 382/236 |
| 6,026,179 | A | * | 2/2000 | Brett ......................... 382/162 |
| 6,026,183 | A | * | 2/2000 | Talluri et al. ................ 382/194 |
| 6,526,173 | B1 | * | 2/2003 | Burns ........................ 382/236 |

(Continued)

FOREIGN PATENT DOCUMENTS

EP        0 666 687 A2     8/1995

(Continued)

OTHER PUBLICATIONS

PCT Written Opinion dated Sep. 30, 2003, for International Application No. PCT/US02/25356, filed Aug. 7, 2002.

(Continued)

*Primary Examiner*—Stella Woo
(74) *Attorney, Agent, or Firm*—Knobbe Martens Olson & Bear LLP

(57) ABSTRACT

A method and system for constructing at least one intermediate frame of an image between first and second frames in a system such as a wired or wireless telephone network. The system identifies a plurality of points having at least one related characteristic in at least one of the first and second frames. The system determines if at least one of the plurality of points has changed its position between the first frame and the second frame. The system associates the at least one of the plurality of points that has changed its position with at least a first pixel in the first frame and a second pixel in the second frame. The system determines a relationship between a position of the first pixel and a position of the second pixel.

40 Claims, 17 Drawing Sheets

U.S. PATENT DOCUMENTS 6,700,601 B1 * 3/2004 Callaci .................... 348/14.12
2005/0047662 A1 * 3/2005 Gorodnichy ................ 382/218

FOREIGN PATENT DOCUMENTS

| JP | 01-272280 | 10/1989 |
|----|-----------|---------|
| JP | 07-107465 | 4/1995 |
| JP | 08-223583 | 8/1996 |
| JP | 2001-177837 | 6/2001 |

OTHER PUBLICATIONS

International Search Report for International Application No. PCT/US02/25356, dated Feb. 14, 2003.

Office Action dated May 7, 2003, issued in U.S. Appl. No. 09/927,132, filed Aug. 10, 2001.

Office Action from the Japanese Patent Office for Japanese Patent Application No. 2003-520095, dated Dec. 11, 2007.

* cited by examiner

Ball Moving Through Frames $\Delta x_{34}$ $\Delta x_{14}$ $\Delta x_{23}$ $\Delta x_{13}$ $\Delta x_{12}$

METHOD AND APPARATUS FOR VIDEO COMMUNICATION OVER A LIMITED BANDWIDTH MEDIUM

CROSS REFERENCE TO RELATED APPLICATION

This application is a continuation-in-part of U.S. patent application Ser. No. 09/927,132 entitled "METHOD AND APPARATUS FOR VIDEO COMMUNICATION OVER A LIMITED BANDWIDTH MEDIUM" and filed on Aug. 10, 2001, now Pat. No. 6,700,601 which claims priority to U.S. Provisional Application No. 60/224,254 entitled "SYSTEM, APPARATUS AND METHOD FOR TRANSMISSION OF VIDEO ACROSS LIMITED BANDWIDTH TRANSMISSION MEDIA" and filed on Aug. 10, 2000. The entire disclosure of the foregoing filed applications is hereby incorporated by reference.

BACKGROUND OF THE INVENTION

1. Field of the Invention

The invention relates generally to a communications system that communicates data over a narrow or limited bandwidth medium. More particularly, the invention relates to a method and apparatus for transmission of video over narrowband transmission channels, such as plain old telephone service (POTS) lines.

2. Description of the Related Art

Video telephones have existed within the marketplace for several years with limited commercial success. The lack of success of videophones is attributable in part to the fact that they do not work very well. It has been problematic to transmit sound and video of acceptable quality across existing telephone lines.

Some available video conferencing systems produce acceptable video and audio quality, and have met with some commercial success. These video conferencing systems depend on wide bandwidth communication connections such as leased lines, ISDN (Integrated Services Digital Network), DSL (Digital Subscriber Lines) and the like. The high bandwidth is necessary to produce acceptable audio and video quality.

The available bandwidth on standard telephone lines has been too low to support industry standard 30 frames per second video. Currently, using compression, the best performance obtainable on standard U.S. telephone lines is approximately 15 video frames per second in one direction. Because 15 video frames per second is less than the persistence of the human eye, which is generally about 24 frames per second, the 15 video frames per second results in a jerky unacceptable video quality. Even with expensive compression hardware, the quality of the resultant video may be unacceptable.

There is therefore a need for video communications systems, which do not depend on expensive compression hardware and yet yield an acceptable video display when transmitted bi-directionally across standard analog telephone lines.

SUMMARY OF THE INVENTION

In one embodiment, the invention provides a method of constructing at least one intermediate frame of an image between first and second frames. The method comprises identifying a plurality of points having at least one related characteristic in at least one of the first and second frames. The method further comprises determining if at least one of the plurality of points has changed its position between the first frame and the second frame. The method further comprises associating the at least one of the plurality of points that has changed its position with at least a first pixel in the first frame and a second pixel in the second frame. The method further comprises determining a relationship between a position of the first pixel and a position of the second pixel.

In another embodiment, the invention provides a system for constructing at least one intermediate frame of an image between first and second frames. The system comprises an identifier circuit configured to identify a plurality of points having at least one related characteristic in at least one of the first and second frames. The system further comprises a compare circuit configured to determine if at least one of the plurality of points has changed its position between the first frame and the second frame. The system further comprises a processing circuit configured to associate the at least one of the plurality of points that has changed its position with at least a first pixel in the first frame and a second pixel in the second frame. The processing circuit is further configured to determine a relationship between a position of the first pixel and a position of the second pixel.

DETAILED DESCRIPTION OF CERTAIN EMBODIMENTS

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
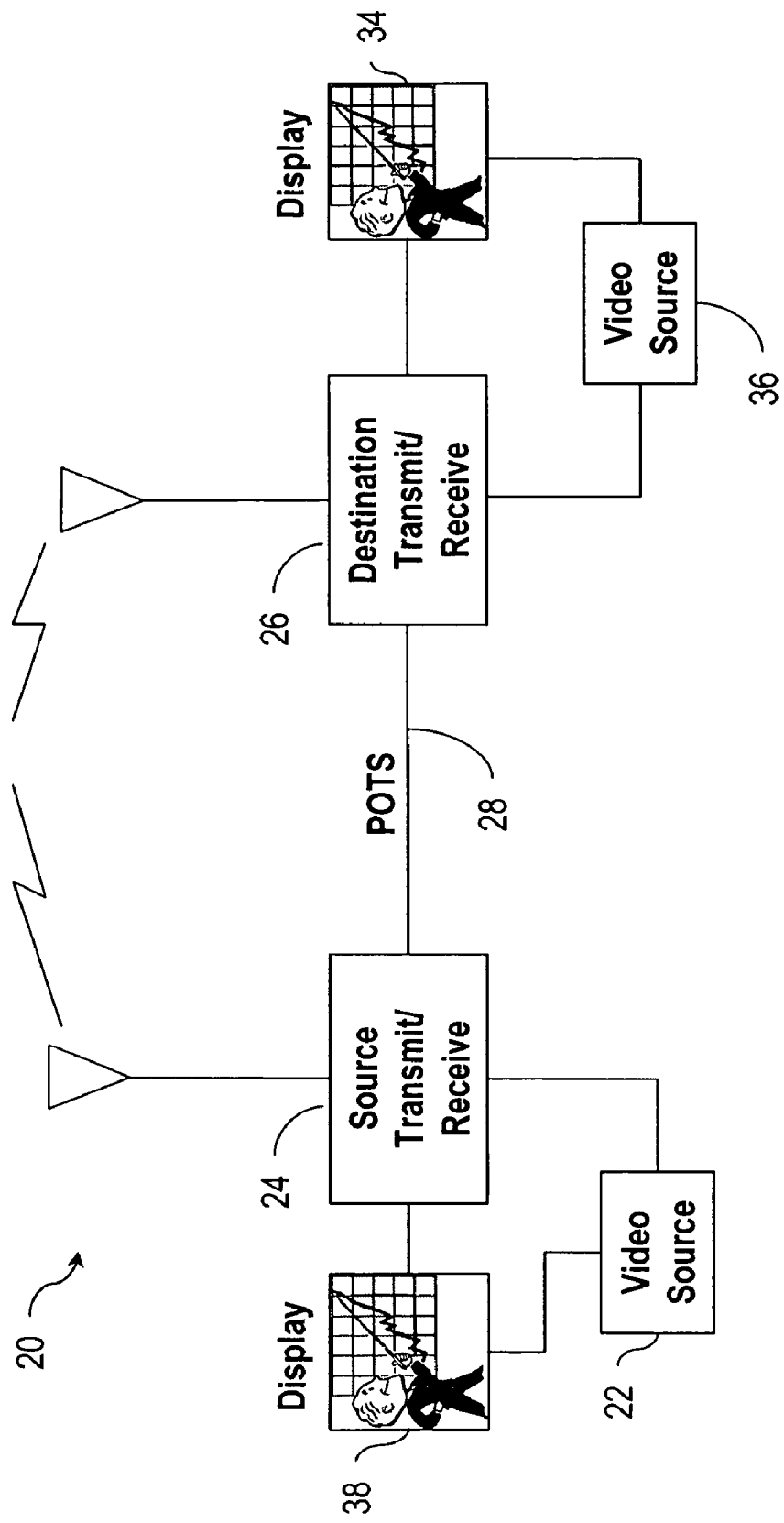
FIG. 1 is a block diagram of one embodiment of a system for video communication over a limited bandwidth medium.

FIG. 1 is a block diagram of one embodiment of a video communication system 20 configured to communicate video over a limited bandwidth medium. The system 20 comprises a video source 22 coupled to a source transmitter/receiver (transceiver) 24. The video source 22 may be, for example, an image capture device such as a camera, a video signal generator such as a digital video disc (DVD) player, video cassette recorder (VCR), or any device (e.g., a computer) having video output, or a communication station receiving a video signal from a remote source. The source transceiver is configured to communicate with a destination transceiver 26 via a plain old telephone service (POTS) 28, also referred to as a public switched telephone network (PSTN). As will be appreciated by those skilled in the art, the transceivers 24, 26 may also be configured for wireless communication. For the convenience of description, some elements of the video communication system 20 are referred to herein with the labels "source" and "destination" for illustrating the direction of video transmission only in this example, however, these labels in no way limit the scope of the invention.

The destination transceiver 26 is coupled to a video display 34, which is configured to display video received at the destination transceiver 26. The system may also include an additional video source 36 coupled to the destination transceiver 26 and the display 34, and an additional display 38, coupled to the video source 22 and the source transceiver 24.

In one embodiment, the video source 22 comprises an image capture device capturing images at a rate of, for example, at least 30 frames per second. The source transceiver 24 communicates with the destination transceiver 26 to test the transmission line for the highest acceptable frame transmission rate, and subsequently transmits images to the destination transceiver 26 at a rate accepted by the transmission line 28, such as 1 frame per second. In one embodiment, the frame transmission rate is mAXimized along while guaranteeing an acceptable data transmission accuracy, in which case the frame transmission rate may be greater than one frame per second. The source transceiver 24 also communicates with the destination transceiver 26 when verification or validation is requested by the destination transceiver.

As stated above, the destination transceiver 26 communicates with the source transceiver 24 to test the transmission line 28 to determine the highest acceptable frame transmission rate. If the quality of the data received by the destination transceiver 26 becomes unacceptable, then the destination transceiver 26 coordinates with the source transceiver 24 to dynamically change the frame transmission rate. As described in further detail below, the destination transceiver 26 reconstructs a video stream from the images or frames received from the source transceiver 26, validating and verifying with the source transceiver 24 regarding any part of the video stream reconstruction process. In one embodiment, the reconstructed video stream includes up to 30 frames per second for display on the display 34.

Figure 2:
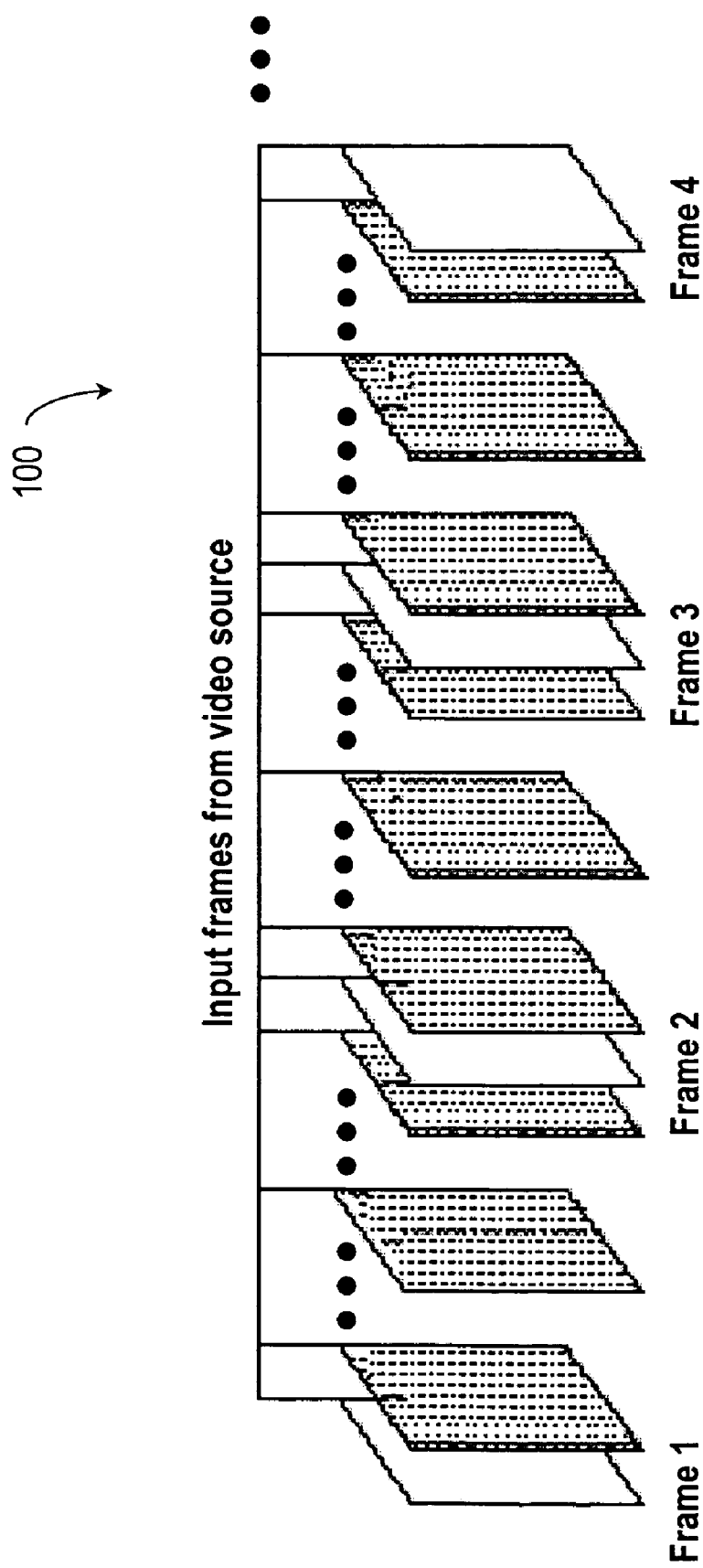
FIG. 2 is an illustration of a video stream generated at one end of and for transmission over the limited bandwidth video communication system of FIG. 1.

In reference to FIG. 2, the source transceiver 24 receives a video stream 100 comprising a plurality of frames from the video source 22. In this illustrative embodiment, the source transceiver 24 selects the first of every 30 frames (unshaded Frame 1, Frame 2, Frame 3, and Frame 4) from the video stream for transmission. The frames interspersed between the transmitted frames, referred to herein as intermediate frames, are stored at the source transceiver for a predefined time period, such as 30 seconds. Thus as used herein, the "intermediate" frame does not only refer to a frame created in the middle of two transmitted frames, but also refers to any frame created between the two transmitted frames. In one embodiment, the predefined storage period for the intermediate frames is at least the length of time the destination transceiver 26 needs to query the source transceiver 24 for information regarding the intermediate frames.

Figure 3:
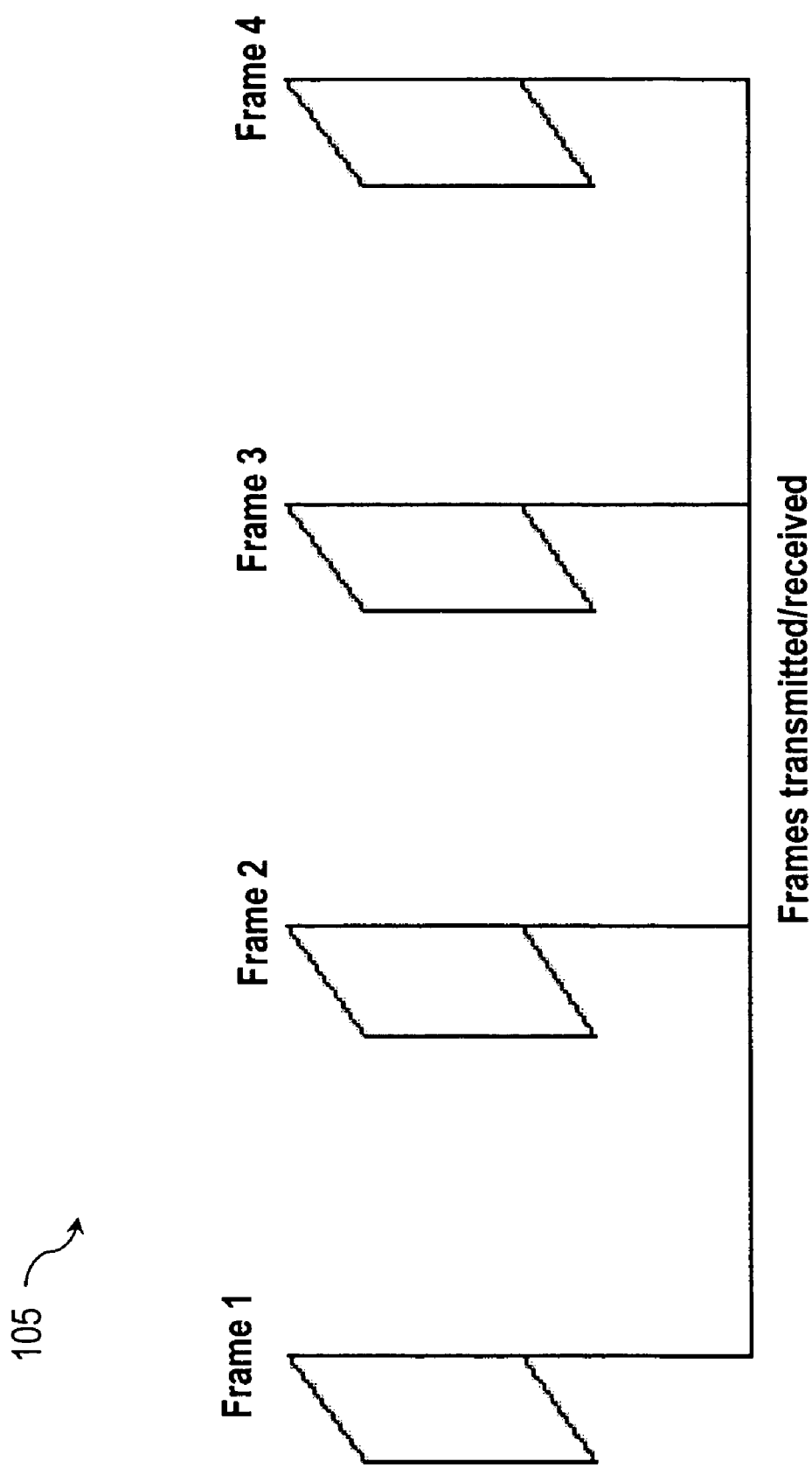
FIG. 3 is an illustration of the frames selected from the video stream illustrated in FIG. 2 for transmission over the video communication system of FIG. 1.
Figure 4:
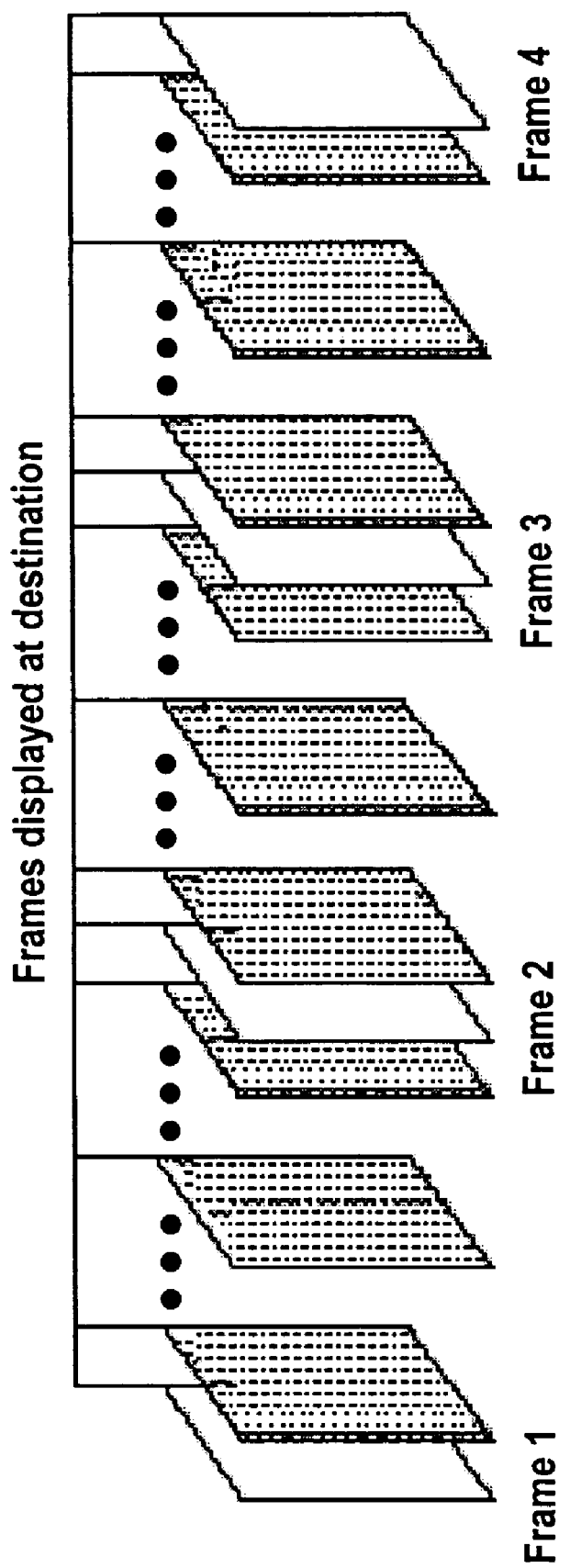
FIG. 4 is an illustration of the video frames displayed at a destination, including the transmitted frames from FIG. 3 and reconstructed frames.

As illustrated in FIG. 3, the source transceiver 24 transmits the selected frames 105, comprising Frame 1, Frame 2, Frame 3, and Frame 4, to the destination transceiver 26. The source transceiver 24 may continue to transmit frames in this format for some length of time. When the destination transceiver 26 identifies a problem or difficulty in reconstruction, the destination transceiver 26 requests information from the source transceiver 24. The evenly disbursed frames 105 of video information are received at the destination transceiver 26 and used to reconstruct 29 frames between each received frame as described in detail below. FIG. 4 illustrates the combination of the reconstructed frames with the received frames (Frame 1, Frame 2, Frame 3, Frame 4), which form a continuous video stream 110 for display on the video display 34. It is desirable to have the reconstructed video stream 110 resemble the originally inputted video stream 100 (see FIG. 2).

I. Adjustment of Frame Transmission Rate

The channel bandwidth used by the video communication system 20 can be reduced by minimizing the amount of information transmitted between the transceivers 24, 26. For example, a reduction in the frame transmission rate over the transmission line 28 corresponds to a reduced use of bandwidth.

In one embodiment of frame transmission rate adjustment, the frames of information sent from the source transceiver 24 are compared to determine the overall percentage of changing pixels from one frame to the next. The destination transceiver 26 compares the individual pixels of one frame are to the individual pixels of another frame to determine whether any of the information for each pixel changes between frames, or whether the pixel information changes a predefined amount above or below a threshold. In one embodiment, the threshold is a percentage of total pixels having different pixel information from one frame to the next, and may be in the range from 40% to 80%. For example, the video frames sent from the source transceiver 24 (Frame 1, Frame 2, Frame 3, Frame 4) are identified as being in over 60% change when over 60% of the pixels in a frame have changing pixel information from one frame to the next (Frame 1 to Frame 2, for example). In the event the pixel change threshold for transmitting one frame per second is 60%, then the source transceiver 24 will continue to send the first frame of every 30 to the destination transceiver 26 in this example. However, once the total change rate drops to less than 60%, the destination transceiver 26 increasingly uses the information in the destination buffers and may send video frames less frequently than one frame per second. For example, only a small portion of a series of video frames may be changing over time, such as a blinking light making up less than 60% of the total pixels in a video frame. In this case, the source transceiver 24 may reduce the frame transmission rate to below one frame per second and only send information regarding the pixels with changing information from one frame to the next. Thus, the source transceiver 24 may send full frames only when necessary or desired, and may proceed to send only object and background information, while keeping this information separate and linked to its associated frames and objects. As used herein, the term "object" is not necessarily limited to a "physical" object as viewed by an eye of an observer, but is a term that refers to two or more (i.e., a group of) pixels that have common or related characteristics, e.g., two or more pixels that undergo the same positional or rate of motion, the same rate of rotation, and/or the same rate of content change, etc. If desired, a complete frame, background or object may be sent intact, where the video stream reconstruction process is substantially the same regardless of the method in which the frames are generated at the destination transceiver 26.

II. Categorization of Frame Contents

In one embodiment, the contents of received frames are categorized according to a variety of criteria. In one embodiment, all contents of a frame (i.e., individual pixels) are first categorized as either part of the background or part of an object. Second, an object is categorized as either a stationary object or a moving object. Third, a moving object is categorized by its type of motion, where the motion includes (1) translation, (2) rotation, or (3) spinning, or any combination of these three types of motion. For a moving object, the system determines motion equations to determine the location of the object in intermediate frames. For a stationary object, the system determines the pixel value of each changing element in the object in intermediate frames. Each object will have either a motion equation or a stationary equation.

According to one embodiment of a method of categorizing the contents of a series of frames, the destination transceiver 26 first locates stationary elements in the series of frames, followed by identification of the pixels in motion. For illustration, a four (4) frame comparison is used to find the stationary elements and pixels in motion. Each frame comprising a plurality of pixels is mapped mathematically as a corresponding matrix $X_N$, wherein the subscript designation "N" for each matrix X corresponds to the frame number. The physical location of elements $x_{ij}$ in the matrix correspond to the physical location of a pixel in a video frame. The subscripts "i" and "j" correspond to the row and column location, respectively, of the element x in the matrix X. The numerical value of an element in the matrix is the value of the pixel in the corresponding frame, and may include, for example, color information such as values corresponding to the level of red, green, and/or blue. The following matrices $X_1$ through $X_4$ are defined for a four frame comparison, wherein the designated frame (e.g., Frame 1) is the first frame in a series of 30 frames:

Frame 1 = $X_1$(matrix of pixels)  (1)

Frame 2 = $X_2$(matrix of pixels)  (2)

Frame 3 = $X_3$(matrix of pixels)  (3)

Frame 4 = $X_4$(matrix of pixels)  (4)

Figure 5:
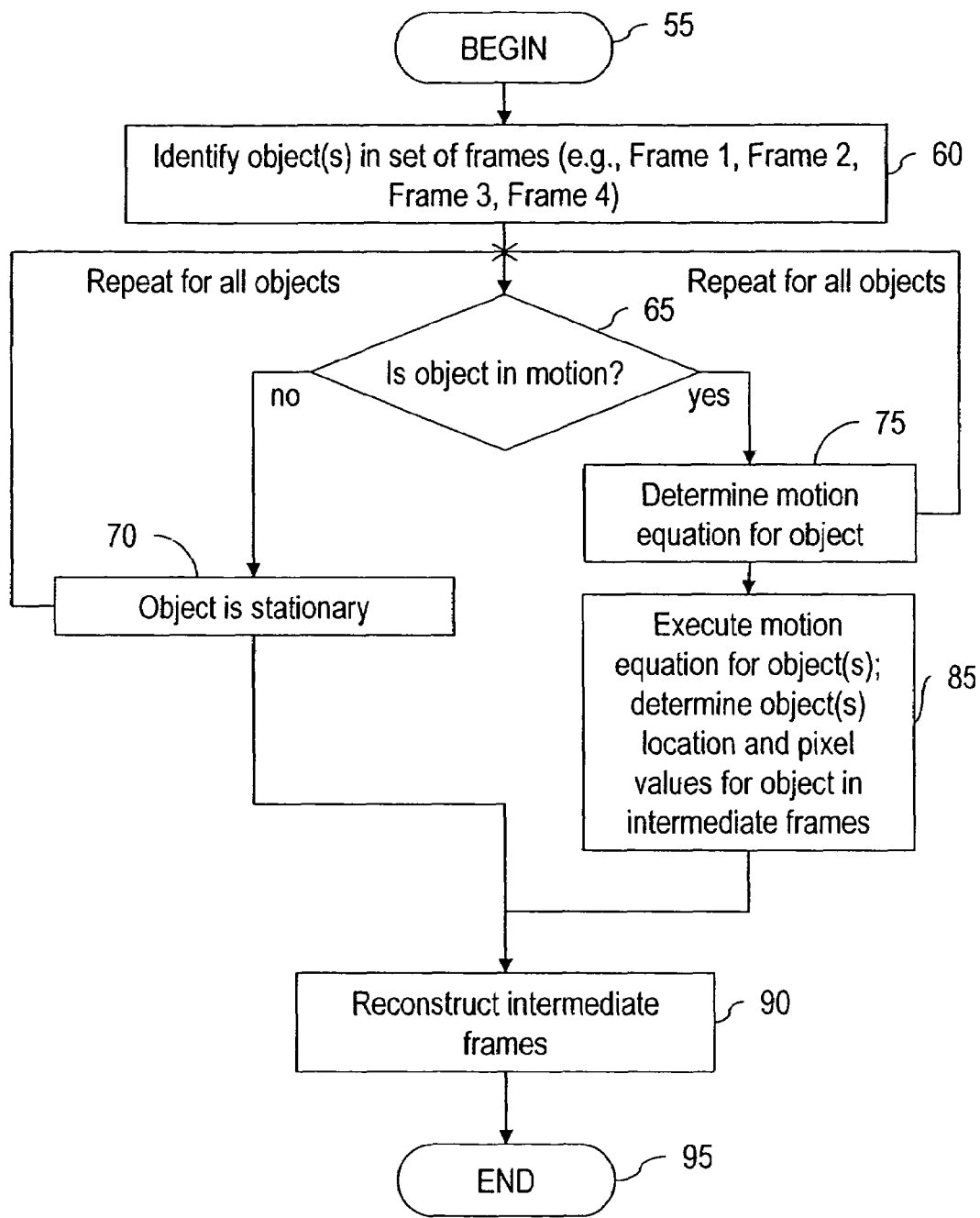
FIG. 5 is a flow diagram illustrating one embodiment of a method of reconstructing intermediate frames at a transceiver based.

III. Overview of Method of Reconstructing Video Frames Using Limited Set of Frames One embodiment of a method 50 of reconstructing video frames using a limited set of frames is illustrated in the flow diagram of FIG. 5. In one embodiment, the method 50 is performed by the destination transceiver 26, but could be performed by the source transceiver 24, or a combination of the source and destination transceivers 24, 26. The method 50 begins in a step 55 and proceeds to a step 60, wherein the destination transceiver identifies an object or plurality of objects in a set of frames (e.g., Frame 1, Frame 2, Frame 3, and Frame 4). In this embodiment, the source transceiver sends the identified frames to a destination receiver. By identifying one or more objects in step 60, the remaining pixels or elements in the frame not identified as part of an object are categorized as part of the stationary background. Following step 60 the method 50 proceeds to a step 65, wherein the destination transceiver 26 determines whether an identified object is in motion. If the answer to the determination in step 65 is no, i.e., the object is not in motion, then the method 50 proceeds to step 70 where the destination transceiver 26 categorizes the object as a stationary object. If the answer to the determination in step 65 is yes, i.e., the object is in motion, then the method 50 proceeds to step 75 where the destination transceiver 26 categorizes the object as an object in motion and determines a motion equation for the object. Steps 65 and 70 or 75 are repeated for all objects identified in step 60.

For objects identified as stationary objects as determined in step 70, the destination transceiver 26 determines the pixel values (e.g., color component information) for the stationary objects in intermediate frames. The destination transceiver may use one of several principles for determining a pixel value in an intermediate frame for the stationary object. In one embodiment, the destination transceiver may use the same value of the pixels of the stationary object as found (a) in Frame 1, (b) in Frame 2, and/or (c) from deriving an average of pixel information for each pixel of the stationary object in Frame 1 and Frame 2. In another embodiment, the destination transceiver may request pixel information for one or more pixels of the stationary object from the source transceiver. For pixels in background, the pixel values are substantially the same in Frame 1, the intermediate frame, and Frame 2.

For objects identified as objects in motion and having a corresponding motion equation as determined in step 75, then the method 50 proceeds to a step 85. In step 85, the destination transceiver executes the motion equations, thereby determining the locations of the objects and pixel values for the objects in intermediate frames. Following step 85, the destination transceiver uses the determinations from steps 60, 75, and 85 to reconstruct intermediate frames in a step 90. In step 90, pixels or elements in a set of frames not identified as objects in step 60 are mapped across the intermediate frame as part of a stationary background. Also in step 90, the pixel values for stationary objects determined in step 70, and object location and pixel value information for objects in motion are used to reconstruct intermediate frames. Following reconstruction of intermediate frames in step 90, the method 50 proceeds to end in a step 95. Each of the steps in the method 50 are described in further detail hereinafter below.

IV. Background Elements

All pixels in a frame that are not part of an object are defined as being on a background plane, and therefore not as objects to be dealt with mathematically. Background planes may have color and/or shade changes, so color and/or shade changes are not always reliable parameters to define objects.

Nevertheless, this information is used to develop basic information about the video frames being communicated and, such information may therefore be communicated to the destination transceiver.

In order to find the stationary or background elements in the stream of frames from Frame 1 to Frame 4, the destination transceiver 26 compares (e.g., subtracts from one another) the frame matrices ($X_1, X_2, X_3$, and $X_4$) corresponding to each of the four frames to obtain a plurality of difference matrices $\Delta X_{NN}$. The comparison of Frame 1 to Frame 2 is represented by the difference matrix $\Delta X_{12}$, for example. In the present embodiment, the source transceiver 24 transmits one frame every second, such that the time between transmission of Frame 1 and Frame 2 is one second, and the time between transmission of Frame 1 and Frame 4 is three seconds. Each difference matrix therefore also has a corresponding time differential $\Delta T_{NN}$, wherein the time differential $\Delta T_{12}$ for the difference matrix $\Delta X_{12}$, for example, is one second. Thus, the following difference matrices are defined using the frame matrices $X_1, X_2, X_3$, and $X_4$, and each difference matrix is made up of difference matrix elements $\Delta x_{ij}$:

$$\Delta X_{12} = X_1 - X_2, \text{ where } \Delta T_{12} = 1\text{sec} \quad (5)$$

$$\Delta X_{13} = X_2 - X_3, \text{ where } \Delta T_{13} = 2\text{sec} \quad (6)$$

$$\Delta X_{14} = X_1 - X_4, \text{ where } \Delta T_{14} = 3\text{sec} \quad (7)$$

$$\Delta X_{23} = X_2 - X_3, \text{ where } \Delta T_{23} = 1\text{sec} \quad (8)$$

$$\Delta X_{34} = X_3 - X_4, \text{ where } \Delta T_{34} = 1\text{sec} \quad (9)$$

According to the above relationships, each zero valued element $\Delta x_{ij}$ in a difference matrix indicates an element that is stationary between the original matrix frame and the corresponding final matrix frame in the difference matrix. A stationary element indicated by zero values in the difference matrices is categorized as either part of the stationary background or inside a non-moving object. Stationary or background elements, once identified by the destination transceiver 26 using the difference matrices, are mapped into memory. Any non-zero values in the difference matrices define elements in motion or that are changing. Only the non-zero or non-stationary elements from the difference matrices are evaluated first for motion and second for stationary changes.

In one embodiment, non-zero elements in the difference matrices are determined using a threshold greater than but close to zero. For example, elements that are changing more than 5% are determined to be non-zero elements, and elements that are changing less than 5% are determined to be zero elements in the difference matrix. In one embodiment, the percentage change of an element refers to the percentage change in a pixel value, where a pixel is defined as an 8 bit binary number. The threshold may be 1%, 2%, 3%, 4%, 5%, 6%, 7%, 8%, 9%, 10%, 11%, 12%, 13%, 14%, or 15%, for example, and may change depending on the image capture device used and the environment of the subject filmed. In addition, the threshold may by adjusted dynamically.

V. Defining Objects

As discussed above, an object is identified as either an object in motion or a stationary object. A moving object has a definable border that moves on some foreground plane, wherein moving objects are defined by united (e.g., adjacent) pixel motion using a base equation with the same or different coefficients. A stationary changing object generally refers to an object with a definable border that has little or no motion associated with it, yet it may contain variations in color and intensities across the stream of frames. This description first provides characteristics of an object in motion.

As noted above, a moving object's video motion is its physical movement inside the stream of frames or matrices, from $X_1$ to $X_2$ to $X_3$ to $X_4 \ldots$ to $X_N$. A moving object's border may be semi-continuous and is normally different in color than the background or other objects in the sequence of frames. The elements that make up an object may contain variations in color and intensity, and the number of elements that make up an object may increase or decrease as the object gets larger or smaller, moves closer to or farther away from the image capture device, or changes shape. The elements that make up a moving object, including the border, may also move at different rates, due to deformation or rotation of the object, for example.

An element on a moving object's border is an element that is in motion change with respect to the background. A moving object's border, or outline, comprises single elements of like motion change that have at least two elements of like motion change on adjacent sides, and at least one element of unlike motion change adjacent to it, thus forming a connecting border outlining the moving object. This concept will be discussed in further detail hereinafter below.

A stationary changing object is an object with substantially little or no motion associated with it, yet it may contain variations in color and intensities across the changing stream of frames or matrices, from $X_1$ to $X_2$ to $X_3$ to $X_4 \ldots$ to $X_N$. An example of a stationary changing object would be a flashing light, where the object is not moving from frame to frame, but is changing in color and intensity.

Figure 6:
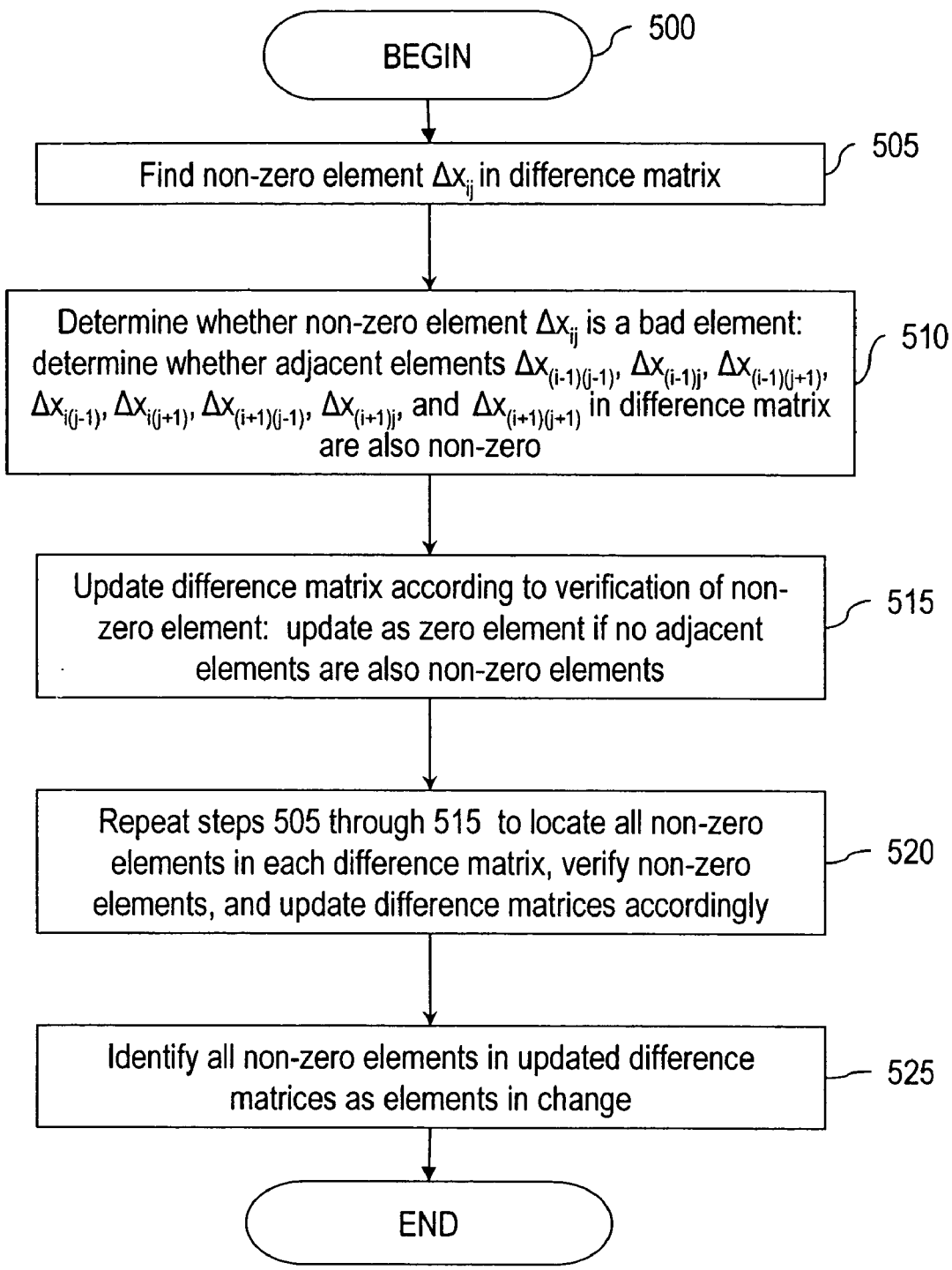
FIG. 6 is a flow diagram illustrating one embodiment of a method of identifying elements of a changing object in a video stream.

One embodiment of a method of identifying an object is illustrated in the flow chart of FIG. 6. The method begins at block 500. In a step 505, the destination transceiver 26 locates the first non-zero element $\Delta x_{ij}$ in the first difference matrix $\Delta X_{12}$ from Frame 1 to Frame 2 by searching each row of matrix elements left to right, top to bottom.

To verify that the non-zero element is not just a bad or erroneous element (such as 'snow'), the destination transceiver 26 determines, in a step 510, whether any of the adjacent or related elements (pixels) $\Delta x_{(i-1)(j-1)}$, $\Delta x_{(i-1)j}$, $\Delta x_{(i-1)(j+1)}$, $\Delta x_{i(j-1)}$, $\Delta x_{i(j+1)}$, $\Delta x_{(i+1)(j-1)}$, $\Delta x_{(i+1)j}$, and $\Delta x_{(i+1)(j+1)}$ in the difference matrix $\Delta X_{12}$ are non-zero. If all of the adjacent elements are zero, then element $x_{ij}$ is identified as a bad element and not an element in change, where element $x_{ij}$ is actually part of the stationary background or is an inside part of a major object. If one or more of the adjacent elements have a non-zero value, then the original element is an element in change and is either on the border of a moving object, a changing part of the stationary background, or an inside part of a rotating object. The difference matrix $\Delta X_{12}$ is then updated in a step 515 with the true zero value of the element if none of the adjacent elements are found to have a non-zero value. In a step 520, steps 505 through 515 are repeated for all elements in $\Delta X_{12}, \Delta X_{23}$, and $\Delta X_{34}$. The method illustrated in FIG. 6 is described in further detail hereinafter below with reference to FIG. 7.

After step 520, the elements in $\Delta X_{12}, \Delta X_{23}$ and $\Delta X_{34}$ that are not equal to zero are defined as elements in change and are part of an object in motion or a stationary changing object. Using the updated difference matrices $\Delta X_{12}, \Delta X_{23}$ and $\Delta X_{34}$, an object's border elements are identified and the object is outlined and positioned in the appropriate frame. The motion equations associated with each potential object are then determined, along with the other elements that make up the object, thus defining substantially all elements of the moving objects.

A. Locating an Object's Border

Figure 7A:
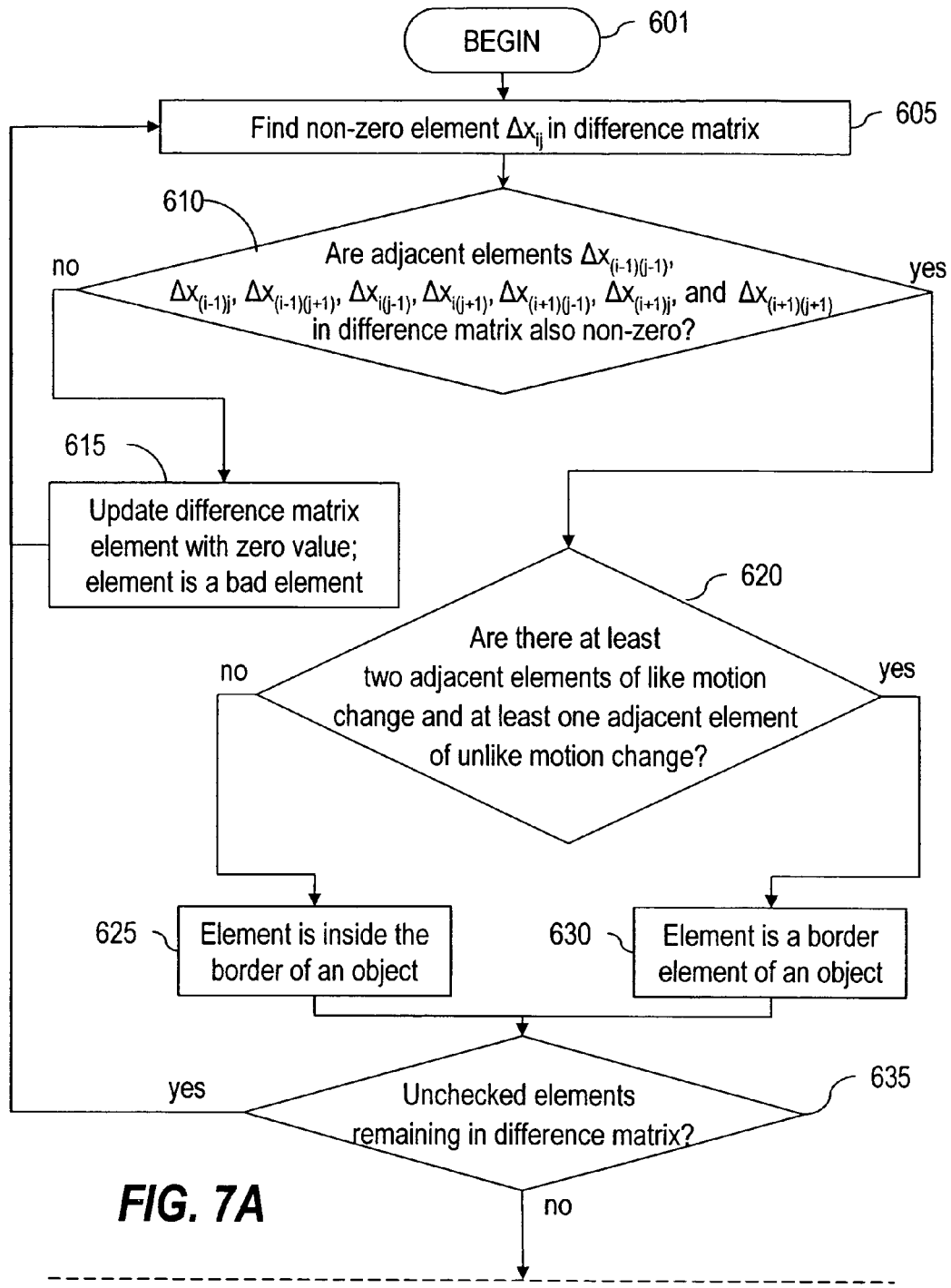
FIGS. 7A-B are a flow diagram illustrating one embodiment of a method of identifying elements as border elements of an object, and outlining and positioning the object in a video frame.
Figure 7B:
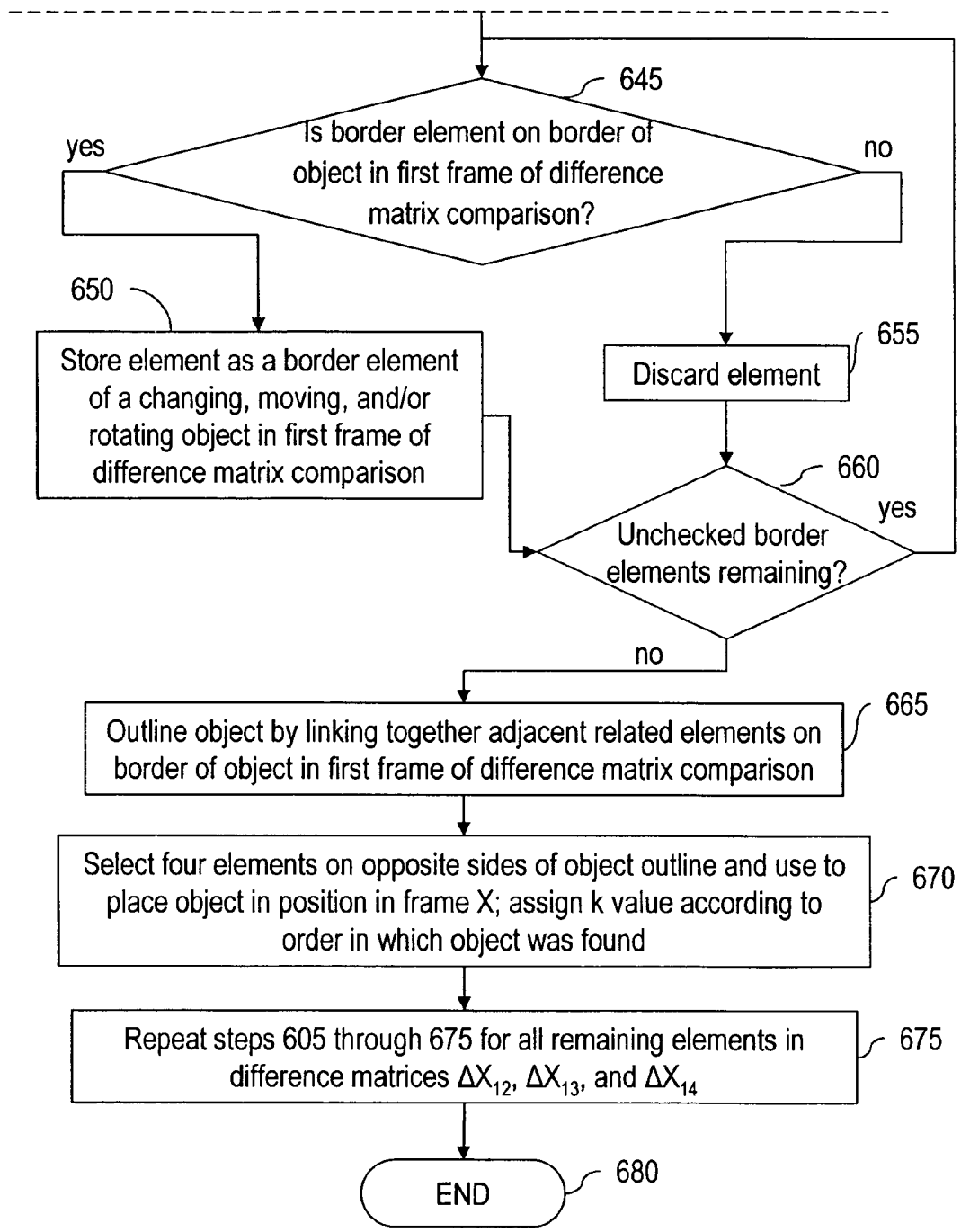

FIGS. 7A-B are a flow diagram illustrating a method of identifying elements as border elements of an object, and outlining and positioning the object in a video frame. In reference to FIG. 7A, the method 600 begins in a step 601 and proceeds to a step 605. In step 605, the destination transceiver 26 locates the first non-zero element in a difference matrix $\Delta X_{12}$, $\Delta X_{23}$ and $\Delta X_{34}$, thus recognizing part of a moving or changing object's border or a bad element. For example, the first non-zero element $\Delta x_{ij}$ in the difference matrix $\Delta X_{12}$ is located in step 605 by searching rows, e.g., left to right, starting from the first row of the matrix and working down.

$$\Delta X_{12} = \begin{bmatrix} \Delta x_{11} & \Delta x_{12} & \Delta x_{13} & \ldots & \Delta x_{1\_176} \\ \Delta x_{21} & \Delta x_{22} & \Delta x_{23} & \ldots & \Delta x_{2\_176} \\ \Delta x_{31} & \Delta x_{32} & \Delta x_{33} & \ldots & \Delta x_{3\_176} \\ \ldots & \ldots & \ldots & \ldots & \ldots \\ \Delta x_{144\_1} & \Delta x_{144\_2} & \Delta x_{144\_3} & \ldots & \Delta x_{144\_176} \end{bmatrix} \quad (10)$$

To verify that the first non-zero element $\Delta x_{ij}$ is not just a bad element, but is an element in motion or change, the destination transceiver 26 analyzes the adjacent or related elements (pixels) $\Delta x_{(i-1)(j-1)}$, $\Delta x_{(i-1)j}$, $\Delta x_{(i-1)(j+1)}$, $\Delta x_{(j-1)}$, $\Delta x_{i(j+1)}$, $\Delta x_{(i+1)(j-1)}$, $\Delta x_{(i+1)j}$, and $\Delta x_{(i+1)(j+1)}$ in $\Delta X_{12}$ in a step 610 to determine whether they are all equal or very close to zero. For the analysis in step 610, the difference matrix $\Delta X_{12}$ is reduced for the non-zero element $\Delta x_{ij}$ to the following matrix $[\Delta x_{ij}]$.

$$[\Delta x_{ij}] = \begin{bmatrix} \Delta x_{(i-1)(j-1)} & \Delta x_{(i-1)j} & \Delta x_{(i-1)(j+1)} \\ \Delta x_{i(j-1)} & \Delta x_{ij} & \Delta x_{i(j+1)} \\ \Delta x_{(i+1)(j-1)} & \Delta x_{(i+1)j} & \Delta x_{(i+1)(j+1)} \end{bmatrix} \quad (11)$$

If the destination transceiver 26 determines in step 610 that no, the adjacent elements in the reduced matrix $[\Delta x_{ij}]$ are not also non-zero, then element $x_{ij}$ in frame $X_1$ is identified as a bad element in a step 615 and not an element in change, but as truly part of the stationary background or an inside part of an object. The value for $\Delta x_{ij}$ in $\Delta X_{12}$ is also updated accordingly in step 615, and the method continues to search the difference matrix for the next non-zero element by returning to step 605.

If the destination transceiver 26 determines in step 610 that yes, the adjacent elements are also non-zero, then the element $x_{ij}$ in frame $X_1$ is identified as an element in change. This element in change may be located on or close to the border of a moving object, a changing part of the stationary background, or an inside part of a rotating object. Upon locating a first true element in change ($\Delta x_{ij}$ in $\Delta X_{12}$), the element is analyzed in a step 620 to determine whether it is on the border of, or a part of a moving or rotating object, or a changing part of a stationary object.

If the element is on the border of a changing, moving and/or rotating object, then there must be at least two adjacent elements of like change, and at least one adjacent element of unlike change, thus forming part of a connecting border outlining the object. If the object is only spinning or stationary and changing it will be found in the same position in $\Delta X_{12}$, $\Delta X_{13}$, and $\Delta X_{14}$. If the object is moving, then it will move predictively between frames and its position in a subsequent frame can be determined with reasonable accuracy. Thus, the destination transceiver 26 determines in a step 620 whether there are at least two adjacent elements of like motion change and at least one adjacent element of unlike motion change for the non-zero element. For example, reduced difference matrix elements $\Delta x_{(i)(j+1)}$ and $\Delta x_{(i+1)(j-1)}$ may have the same value as the non-zero element $\Delta x_{ij}$, and reduced difference matrix element $\Delta x_{(i)(j-1)}$ may have a different value than the non-zero element $\Delta x_{ij}$. In one embodiment, if the destination transceiver 26 determines in step 620 that no, there are not at least two adjacent elements of like change and at least one adjacent element of unlike change for the non-zero element $\Delta x_{ij}$, then the element is identified as inside an object in a step 625 and the method returns to step 605. Alternately, if the destination transceiver 26 determines in step 620 that yes, there are at least two adjacent elements of like change and at least one adjacent element of unlike change for the non-zero element $\Delta x_{ij}$, then the element is assumed to be a border element of an object in a step 630.

In one embodiment, the non-zero element $\Delta x_{ij}$ is not assumed to be on the border of an object in step 630, and the destination transceiver 26 performs an additional analysis of the reduced matrix $[\Delta x_{ij}]$ to determine whether the element is a changing element inside the border of an object. For example, a solid colored moving or rotating object may not have any non-zero difference matrix values ($\Delta x$) except on the border of the object. The non-zero element $\Delta x_{ij}$ is identified as a changing element inside the border of a changing object if it has at least six adjacent elements of like change. This determination may be made in step 625.

Still referring to FIG. 7A, following steps 625 and 630 wherein a non-zero element is identified as either inside a changing or rotating object or as a border element of an object, the method 600 proceeds to a step 635 where the destination transceiver determines whether non-zero elements remain in the difference matrix that have not been analyzed. If unchecked non-zero elements remain in the difference matrix, then the method 600 returns to step 605. If no non-zero elements remain in the difference matrix, then the method proceeds to a step 645, illustrated in FIG. 7B.

In step 645, the destination transceiver 26 determines whether a border element is on the border of the object as it appears in the first frame or on the border of the object as it appears in the second frame of the difference matrix comparison. For example, if the border element $\Delta x_{ij}$ is from the difference matrix $\Delta X_{12}$, the method determines whether the corresponding border element $x_{ij}$ is on the border of the object as the object appears in Frame 1, or on the border of the object as the object appears in Frame 2. If the destination transceiver determines in step 645 that yes, the border element $x_{ij}$ is on the border of the object in the first frame of the difference matrix comparison (Frame 1 in the current example), then the element is stored as a border element of a changing, moving, and/or rotating object in a step 650. If the destination transceiver determines in step 645 that no, the border element $x_{ij}$ is not on the border of the object in the first frame, but on the border of the object in the second frame of the difference matrix comparison (Frame 2 in the current example), then it is discarded in a step 655. Following steps 645 and 655, the method 600 proceeds to a step 660, wherein the destination transceiver 26 determines whether border elements remain in the difference matrix that have not been checked in step 645. If the destination transceiver determines in step 660 that yes, unchecked border elements remain in the difference matrix, then the method 600 returns to step 645. If the destination transceiver 26 determines in step 660 that no, there are no unchecked border elements remaining in the difference matrix, then the method 600 proceeds to a step 665.

Where the determination in step 645 is no, the border element $x_{ij}$ is not on the border of the object in the first frame, then the destination transceiver 26 assumes the object is moving from left to right between the frames in the difference matrix comparison. For example, where an object is moving from left to right between Frame 1 and Frame 2, and where the destination transceiver 26 scans the difference matrix from left to right, the first border element for the object identified in the difference matrix $\Delta X_{12}$ will not be on the border of the object as the object appears in Frame 1, but on the object as it appears in Frame 2. Thus, in one embodiment, where the destination transceiver 26 determines that no, the border element $x_{ij}$ is not on the border of the object in the first frame, the destination transceiver 26 repeats steps 645 through 660 by scanning the difference matrix from the bottom up, right to left. Thereby, the destination transceiver 26 can identify the location of the border element of the object in the first frame of the difference matrix comparison.

B. Outlining an Object

Once all of the border elements of a single object in the first frame of the difference matrix comparison are located by repeating steps 645 through 660, the object is outlined in step 665. In step 665, the object in the first frame of the difference matrix comparison is outlined by linking together adjacent related elements by identifying like changes in color on the border of the object. In one embodiment, elements $x_{ij}$ in each frame matrix $X_N$ are expressed in the form of a digital number corresponding to the levels of red, green, and blue for a given pixel. A difference matrix element $\Delta x_{ij}$ therefore provides information as to whether a pixel is changing color between frames by providing a mathematical comparison of a matrix element value in a first frame and a second frame. Thus, difference matrix elements $\Delta x_{ij}$ having similar values indicate like changes in color, and adjacent difference matrix elements indicating like changes in color designate border elements on a single object.

Figure 8:
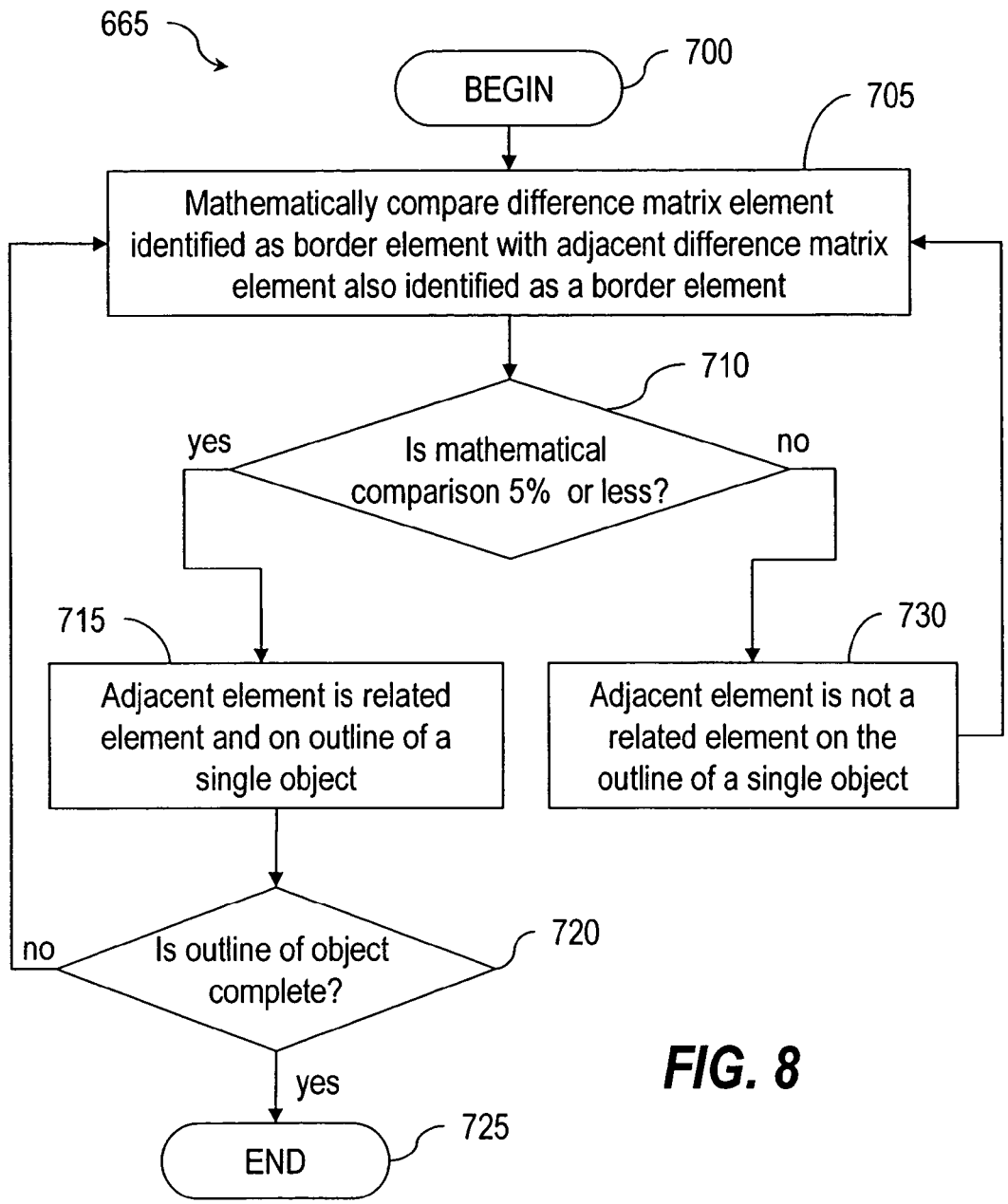
FIG. 8 is a flow diagram illustrating one embodiment of a method of outlining an object in accordance with the method illustrated in FIG. 7.

An exemplary method 665 of outlining an object is illustrated in FIG. 8, where the method begins at a step 700. In a step 705, the destination transceiver 26 mathematically compares the value of a difference matrix element $\Delta x_{ij}$, identified as a border element, to an adjacent difference matrix element also identified as a border element. In a step 710, the destination transceiver 26 determines whether the comparison yields a difference of 5% or less, for example. If the destination transceiver 26 determines in step 710 that yes, the comparison yields a difference of 5% or less, then the adjacent element is identified as a related element and as part of the outline of a single object in a step 715. Following step 715, the destination transceiver 26 determines whether the outline of the object is complete in a step 720. If the destination transceiver determines in step 720 that yes, the outline of the object is complete, then the method 640 proceeds to an end step 725. If the destination transceiver determines in step 720 that no, the outline of the object is not complete, the method returns to step 705. If the destination transceiver 26 determines in step 710 that no, the comparison does not yield a difference of 5% or less, then the adjacent element is identified as not a related element on the outline of a single object in a step 730. Following step 730, the method returns to step 705. As will be appreciated by one skilled in the art, the difference threshold for identifying related elements may be greater than or less than 5%, such as 1%, 2%, 3%, 4%, 6%, 7%, 8%, 9%, and 10%, and the 5% threshold is used for illustrative purposes only.

C. Identifying and Positioning the Outlined Object in Transmitted Frames

Referring again to FIG. 7B, following the outlining of the object in step 665, elements on the outlined object are used to identify the position of the object in each of the transmitted video frames $X_1$, $X_2$, $X_3$ and $X_4$. Specifically, following step 665 the method 600 proceeds to a step 670, wherein four elements along the border and on opposite sides of the object are selected and used to identify and position the object in each frame $X_1$, $X_2$, $X_3$ and $X_4$ according to color and position information. In one embodiment, the first element is the first border element of the object located when scanning the difference matrices. In one embodiment, these chosen elements are on opposite sides of the object, wherein lines drawn connecting these elements around the perimeter of the object form a rectangle, and more preferably a square. The chosen elements define the pixel locations of where the object is placed in respective frames when positioning the objects in the output frames.

A k value is also assigned to the object in step 645 for storage of the object in memory. The k value assigned to an object corresponds to the order in which the object is identified (1 to 100,000, for example), and an object retains the same k value in each frame. Once an object is outlined, identified and positioned in the video frames, steps 605 through 645 are repeated for all remaining elements in the difference matrices $\Delta X_{12}$, $\Delta X_{23}$, and $\Delta X_{34}$ in a step 650.

VI. Example of Moving Ball

Figure 9A:
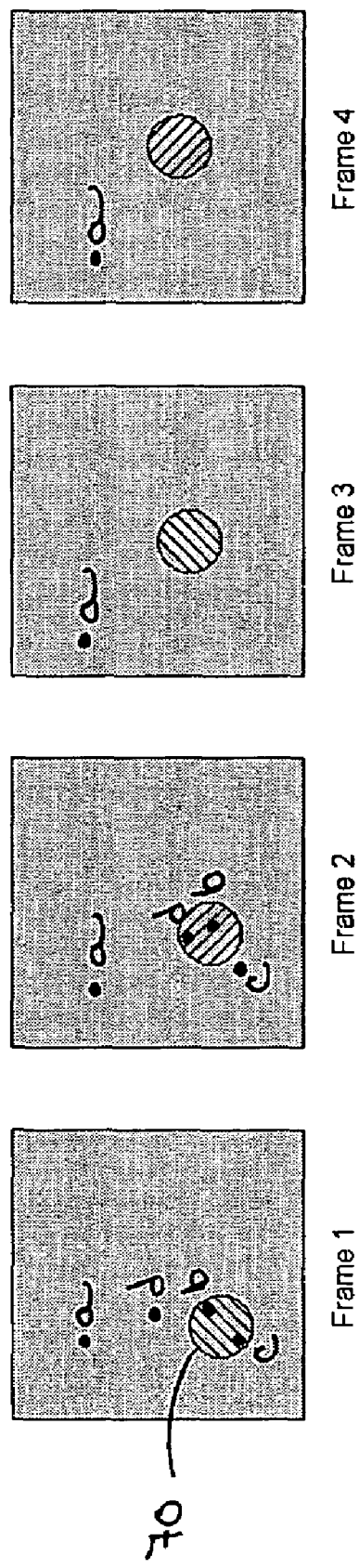
FIG. 9A is an illustration of four video frames for an example of a ball moving across a solid background.

One embodiment of a method of identifying an object and its motion will be discussed in an exemplary application manner. This example comprises a moving ball 70, where the ball is possibly in a different position in each frame of a series of frames. FIG. 9A illustrates four frames (Frame 1, Frame 2, Frame 3, and Frame 4) of a series of captured frames, where the ball 70 is in a different position in each of the four frames. Each illustrated frame is the first frame captured in a 30 frame per second video capture sequence. Thus, the time between frames illustrated in sequence is 60 seconds.

In the present example, the videoconferencing standard Quarter Common Intermediate Format (QCIF) is used where each frame comprises a 144 by 176 pixel grid, comprising 144 rows (i=1, 2, 3, . . . 144) and 176 columns (j=1, 2, 3, . . . 176) of pixels. The corresponding difference matrix $X_N$ for each frame (Frame 1, Frame 2, Frame 3, and Frame 4) is defined as follows in equation (12). Each element $x_{ij}$ of the matrix has corresponding location information identified by a subscript, where "i" corresponds to the row in which the element is located in the matrix, and "j" corresponds the column in which the element is located in the matrix.

$$X_N = \begin{bmatrix} x_{11} & x_{12} & x_{13} & \ldots & x_{1\_176} \\ x_{21} & x_{22} & x_{23} & \ldots & x_{2\_176} \\ x_{31} & x_{32} & x_{33} & \ldots & x_{3\_176} \\ \ldots & \ldots & \ldots & \ldots & \ldots \\ x_{144\_1} & x_{144\_2} & x_{144\_3} & \ldots & x_{144\_176} \end{bmatrix} \quad (12)$$

Furthermore, each pixel has corresponding color information expressed as an eight bit binary number, one byte long. The color information comprises red, green, and blue components, where the first two bits of the eight bit number correspond to blue components, the next three bits correspond to green components, and the last three bits correspond to red components as follows:

| Pixel | | | | | | | | |
|---|---|---|---|---|---|---|---|---|
| Bit | 1 | 2 | 3 | 4 | 5 | 6 | 7 | 8 |
| color component | b | b | g | g | g | r | r | r |

The value of each element $x_{ij}$ in the frame matrix $X_N$ is the eight bit binary number representing the color information for the pixel corresponding to the element $x_{ij}$ in the frame matrix $X_N$. In this example, the ball 70 is undergoing two types of motion: translation and spinning.

As illustrated in FIG. 9A, the ball 70 moves across a light blue background and the ball is a single solid color. The background and ball colors are defined as follows in eight-bit color form for each pixel:

| Background Color | | | | | | | | |
|---|---|---|---|---|---|---|---|---|
| bit number | 1 | 2 | 3 | 4 | 5 | 6 | 7 | 8 |
| color component | b | b | g | g | g | r | r | r |
| bit value | 0 | 1 | 0 | 0 | 1 | 0 | 0 | 1 |
| Ball Color | | | | | | | | |
| bit number | 1 | 2 | 3 | 4 | 5 | 6 | 7 | 8 |
| color component | b | b | g | g | g | r | r | r |
| bit value | 1 | 1 | 0 | 1 | 1 | 0 | 1 | 1 |

Figure 9B:
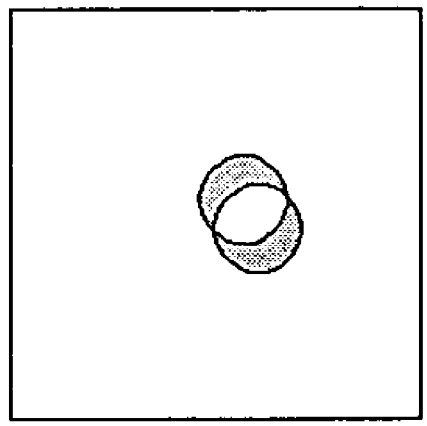
FIG. 9B is an illustration of the frame representations corresponding to the difference matrices for the video frames of FIG. 9A.
Figure 9B:
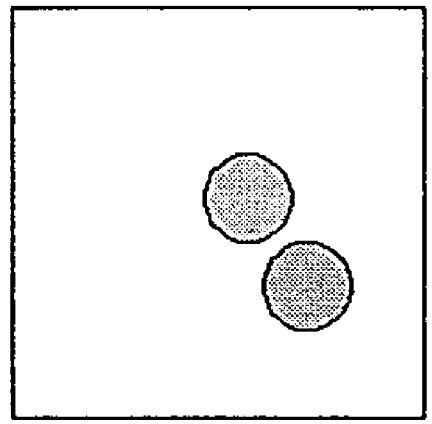
Figure 9B:
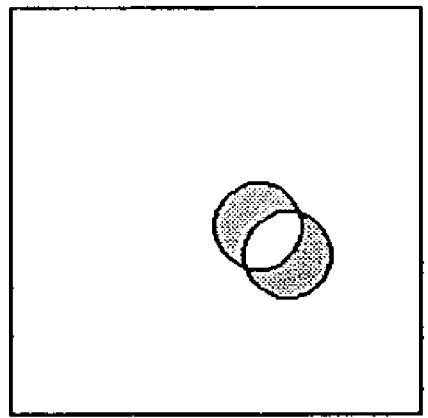
Figure 9B:
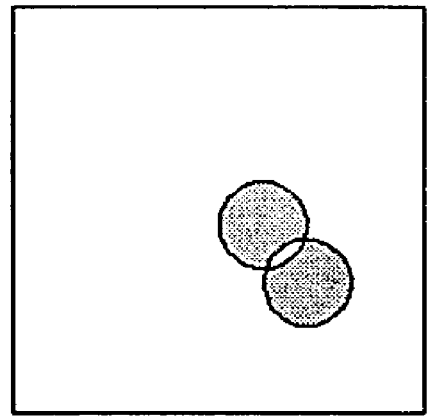
Figure 9B:
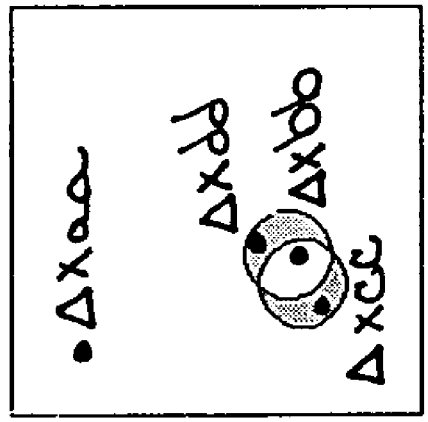

FIG. 9B shows frame representations of the following difference matrices: $\Delta X_{12}$, $\Delta X_{23}$, $\Delta X_{34}$, $\Delta X_{13}$, $\Delta X_{14}$. For the moving ball 70, the difference matrices ($\Delta X$'s) are color differences between frames. If any points are substantially the same between frames (have substantially the same color information) they will be zeroed out, but if the background is subtracted from an object, or the object is subtracted from the background, differences in color result and are identified in the difference matrices.

A. Stationary Elements

The destination transceiver 26 identifies elements that are not changing between the four frames as stationary elements by calculating the difference matrices $\Delta X_{12}$, $\Delta X_{23}$, and $\Delta X_{34}$, where all elements not on the ball zero out. For example, a frame matrix element $x_{aa}$, corresponding to pixel a in the background in Frame 1, has a frame matrix $X_1$ value of 01001001 (pixel value for background color). The same frame matrix element $x_{aa}$ corresponding to pixel a in Frame 2 has the same pixel value of 01001001 in frame matrix $X_2$. Therefore, the difference matrix element $\Delta x_{aa}$ in the difference matrix $\Delta X_{12}$ is zero, where the frame matrix element $x_{aa}$ has the same pixel value in both frame matrix $X_1$ and frame matrix $X_2$.

Similar to elements in the background, all elements on the ball in both Frame 1 and Frame 2 also zero out in the difference matrix $\Delta X_{12}$. An element $x_{bb}$, corresponding to pixel b on the ball in Frame 1, has a frame matrix $X_1$ value of 11011011 (pixel value for ball color), and the same frame matrix element $x_{bb}$ corresponding to pixel b in Frame 2 has a frame matrix $X_1$ value of 11011011. Therefore, the difference matrix value $\Delta x_{aa}$ in the difference matrix $\Delta X_{12}$ is zero, where the frame matrix element $x_{bb}$ has the same pixel value in both frame matrix $X_1$ and frame matrix $X_2$.

B. Changing Elements

All elements on the ball in Frame 1 and on the background in Frame 2 will have a frame matrix value of 11011011 (ball color) in frame matrix $X_1$ and a frame matrix value of 01001001 (background color) in frame matrix $X_2$. For example, a frame matrix element $x_{cc}$, corresponding to a pixel c in Frame 1 and Frame 2, will have a frame matrix value of 11011011 in frame matrix $X_1$ and a frame matrix value of 01001001 in frame matrix $X_2$. The difference matrix value $\Delta x_{cc}$ in the difference matrix $\Delta X_{12}$ ($X_1$-$X_2$) is the difference between the frame matrix value for element $x_{cc}$ in frame matrix $X_1$ and the frame matrix value for element $x_{cc}$ in frame matrix $X_2$. Thus, the difference matrix value $\Delta x_{cc}$ in the difference matrix $\Delta X_{12}$ is 11011011−01001001=10010010.

In contrast, all elements on the ball in Frame 2 and on the background in Frame 1 will have a frame matrix value of 01001001 in frame matrix $X_1$, and a frame matrix value of 11011011 in frame matrix $X_2$. For example, a frame matrix element $x_{dd}$, corresponding to a pixel d in Frame 1 and Frame 2, will have a frame matrix value of 01001001 in frame matrix $X_1$ and a frame matrix value of 11011011 in frame matrix $X_2$. The difference matrix value $\Delta x_{dd}$ in the difference matrix $\Delta x_{12}$ ($X_1$-$X_2$) is the difference between the frame matrix value for element $x_{dd}$ in frame matrix $X_1$ and the frame matrix value for element $x_{dd}$ in frame matrix $X_2$. Therefore, the difference matrix value $\Delta x_{dd}$ in difference matrix $\Delta X_{12}$ is 01001001−11011011=1111111111111111111111101101110, which is a negative number expressed in binary form in more than eight bits. Since a difference matrix value in the current example may only be eight bits, and an overflow condition may not be used, the opposite difference matrix value $\Delta X_{21}$ ($X_2$-$X_1$) is calculated to obtain the value 10010010 for difference matrix element $\Delta x_{dd}$ and a flag is added in the associated memory for these bits. Specifically, a parity bit is used as a flag, wherein if the difference matrix value for an element is negative, the parity bit is set to one (1), and if the difference matrix value is positive, the parity bit is set to zero.

In one embodiment, the parity bit information is used to determine the direction of movement of an object. For example, where the destination transceiver 26 scans a difference matrix from the top down and from left to right, if the parity bit is set to one (1) for the border elements at the top of the object's outline, the border of the object is in motion to the left and/or up. Conversely, if the parity bit is not set (zero) for the border elements at the top of the object's outline, the border of the object is in motion to the right and/or down.

All the matrix value subtractions for the remaining difference matrices $\Delta X_{23}$ and $\Delta X_{34}$ are performed in congruence with the above method. Then the object is located according to the method 600 illustrated in FIGS. 7A-B.

C. Object Identification

According to step 605, the first difference matrix $\Delta X_{12}$ is scanned for the first non-zero element $\Delta x_{ij}$ by searching the rows of the matrix left to right, starting from the top row of the matrix.

$$[\Delta x_{ij}] = \begin{bmatrix} \Delta x_{(i-1)(j-1)} & \Delta x_{(i-1)j} & \Delta x_{(i-1)(j+1)} \\ \Delta x_{i(j-1)} & \Delta x_{ij} & \Delta x_{i(j+1)} \\ \Delta x_{(i+1)(j-1)} & \Delta x_{(i+1)j} & \Delta x_{(i+1)(j+1)} \end{bmatrix} \quad (13)$$

$$= \begin{bmatrix} 0 & 0 & 0 \\ 0 & 10010010 & 0 \\ 10010010 & 10010010 & 10010010 \end{bmatrix}$$

To verify that the first non-zero element $\Delta x_{ij}$ is not just a bad element or noise, and it is an element in motion or change, the method determines in step 610 whether the adjacent or related elements $\Delta x_{(i-1)(j-1)}$, $\Delta x_{(i-1)j}$, $\Delta x_{(i-1)(j+1)}$, $\Delta x_{i(j-1)}$, $\Delta x_{i(j+1)}$, $\Delta x_{(i+1)(j-1)}$, $\Delta x_{(i+1)j}$, and $\Delta x_{(i+1)(j+)}$ in $\Delta X_{12}$ are not all equal to zero. Specifically, the method will identify that three adjacent elements $\Delta x_{(i+1)(j-1)}$, $\Delta x_{(i+1)j}$, and $\Delta x_{(i+1)(j+1)}$ are not equal to zero ($\Delta x_{(i+1)(j-1)} = \Delta x_{(i+1)j} = \Delta x_{(i+1)(j+1)} = 10010010$). Since all of the adjacent elements are not zero, then element $x_{ij}$ is an element in change and may be on the border of a moving object, a changing part of the stationary background, or an inside part of a rotating object. However, if all of the adjacent elements $\Delta x_{(i-1)(j-1)}$, $\Delta x_{(i-1)j}$, $\Delta x_{(i-1)(j+1)}$, $\Delta x_{i(j-1)}$, $\Delta x_{i(j+1)}$, $\Delta x_{(i+1)(j-1)}$, $\Delta x_{(i+1)j}$, and $\Delta x_{(i+1)(j+1)}$ in $\Delta X_{12}$ were substantially equal to zero, then the first non-zero element $\Delta x_{ij}$ would be identified as a bad element in step 615 and the next non-zero element in the difference matrix $\Delta X_{12}$ would be located in step 605.

If the ball 70 is only rotating or changing in color, it will be found in the same position in $\Delta X_{12}$, $\Delta X_{13}$, and $\Delta X_{14}$. However, as shown in the frame representations of the difference matrices $\Delta X_{12}$, $\Delta X_{13}$, and $\Delta X_{14}$ in FIG. 9B, the ball 70 is in translation and not just rotation or changing in color. In a step 620, the destination transceiver 26 determines whether the first non-zero element $\Delta x_{ij}$ in the difference matrix $\Delta X_{12}$ is on the border of a moving object. In reference to the reduced matrix for the first non-zero element $\Delta x_{ij}$, at least two adjacent elements have like motion change and at least one adjacent element has unlike motion change. Specifically, three adjacent elements $\Delta x_{(i+1)(j-1)}$, $\Delta x_{(i+1)j}$, and $\Delta x_{(i+1)(j+1)}$ have like motion change (10010010) and five adjacent elements $\Delta x_{(i-1)(j-1)}$, $\Delta x_{(i-1)j}$, $\Delta x_{(i-1)(j+1)}$, $\Delta x_{i(j-1)}$, and $\Delta x_{i(j+1)}$ have unlike motion change. Thus, as the destination transceiver 26 will determine in step 620 that yes, the first non-zero element is on the border of a moving object, then element $\Delta x_{ij}$ is identified as a border element of an object in a step 630.

In the event the destination transceiver determines in step 620 that no, the non-zero element is not on the border of a moving object, then the destination transceiver 26 may determine that the non-zero element $\Delta x_{ij}$ is inside an object. More particularly, if the destination transceiver 26 determines that there are at least six adjacent elements of like motion change, then the non-zero element $\Delta x_{ij}$ is identified as an element inside a stationary changing or rotating object. For example, the non-zero element may be inside an object that is changing color or a flashing light. The non-zero element identified as inside a stationary changing or rotating object is stored in memory according to this identification and the destination transceiver continues to identify objects and their border elements according to the method 600 illustrated in FIGS. 7A-B.

Following the identification of a non-zero element as either inside a changing object in step 625 or as a border element in step 630, the destination transceiver 26 determines in step 635 whether elements remain in the difference matrices $\Delta X_{12}$, $\Delta X_{13}$, and $\Delta X_{14}$ that have not been analyzed in steps 605 through 630. If the determination in step 635 is no, the method 600 returns to step 605 and the destination transceiver 26 locates the next non-zero element in the difference matrix.

D. Outlining an Object

The border elements identified in step 650 of the method 600 illustrated in FIG. 7B are used as starting elements to outline an associated object in the frame matrices $X_1$, $X_2$, $X_3$ and $X_4$. An outline of an object is defined by linking together adjacent related elements on the border of the object using the difference matrices $\Delta X_{12}$, $\Delta X_{23}$ and $\Delta X_{34}$ and frame matrices $X_1$, $X_2$, $X_3$ and $X_4$.

We previously identified non-zero element $\Delta x_{ij} = 10010010$ as a border element of an object, where adjacent elements $\Delta x_{(i+1)(j-1)}$, $\Delta x_{(i+1)j}$, and $\Delta x_{(i+1)(j+1)}$ had like change (10010010). To verify that non-zero element $\Delta x_{ij}$ is the beginning of an outline of an object, the difference matrix $\Delta X_{12}$ is subsequently analyzed to verify the identified pattern of like change ($\Delta x_{(i+1)(j-1)} = \Delta x_{(i+1)j} = \Delta x_{(i+1)(j+1)} = 10010010$). The adjacent elements having like change and identified in this manner are linked together to establish the outline of an object. Four elements on opposite sides of the outline of an object are chosen, where the first element is the frame element $x_{ij}$ corresponding to the first non-zero element $\Delta x_{ij}$. The other three elements are chosen such that lines drawn connecting the elements form an "X" or a box. The four chosen elements are used to define the pixel location of where the object is to be placed in the reconstructed intermediate frames.

After outlining each object using difference matrices $\Delta X_{12}$, $\Delta X_{23}$, and $\Delta X_{34}$ and identifying four elements on the outlines of the objects, the four elements are used to position their corresponding object in the frame matrices $X_1$, $X_2$, $X_3$ and $X_4$. In one embodiment, the adjacent elements surrounding one of the four elements form a signature pattern in conjunction with the chosen element. This pattern may also be used to locate and position an object in a frame. Once an outlined object is positioned in the frame matrices, the object information is saved in memory by assigning a k value according to the order the object was found. Since this example only comprises one object, its k value is 1.

VII. Motion Equations for Object in Motion

As briefly described in Section II, after identifying and storing the outline of an object in memory, the object's motion equations are determined to reconstruct the intermediate frames (frames between each of the transmitted frames Frame 1, Frame 2, Frame 3, and Frame 4). The motion equations thereby enable reconstruction so as to supply a 30 frame per second output video to the display 34. In order to determine an object's motion equations, the type of motion an object is experiencing is first determined.

A. Determining Type of Motion

In order to determine an object's motion equations, the system first determines the type of motion the object is undergoing. An object's motion may be categorized into one or a combination of three types of motion: translation, rotation, and spinning. An element or pixel $x_{ij}$ in frame matrix $X_N$ is defined in space by a three dimensional vector $x_{ij} = p(x\ y\ k)$, where x=i, y=j, and k is the element's relative spatial plane. If an object is in translation, it is moving through space from one location a(x y k) to another location b(x y k). If an object is in rotation, it is rotating about a location c(x y k) external to the object. Finally, if an object is spinning, it is rotating about a location c(x y k) found within the object. Typically, a rotating or spinning object has at least one fixed element in the frame or matrix about which the object is rotating, translation has none. Pure translation moves all elements that make up an object an equal distance as the object moves from frame to frame.

By saving and examining the object outlined with a given k plane value and derived from frame matrices $X_1$, $X_2$, $X_3$ and $X_4$, the object may be evaluated to determine its type of motion. To determine whether an object is in translation, rotation, or both, at least two points on the outline of the object, defined in $\Delta X_{12}$, $\Delta X_{23}$, and $\Delta X_{34}$, are followed through the frames $X_1$, $X_2$, $X_3$ and $X_4$. In one embodiment, the two elements are on opposite sides of the object.

Using the two elements, $p_1(x\ y\ k)$ and $p_2(X\ y\ k)$, on opposite sides of the chosen object, the object's motion through space may be determined. In the first frame $X_1$, the two elements have locations $p_1(x\ y\ k)$ and $p_2(X\ y\ k)$, and on the second frame $X_2$, the two elements of the same object are at the locations $p'_1(x'\ y'\ k)$ and $p'_2(x'\ y'\ k)$. The length of a line drawn between $p_1(x\ y\ k)$ and $p_2(x\ y\ k)$ is the same as the length of a line drawn between $p'_1(x'\ y'\ k)$ and $p'_2(x'\ y'\ k)$.

If the distance between $p_1$ and $p'_1$, calculated as $\sqrt{(\Delta x)^2 + (\Delta y)^2}$ counting pixels, is equal to the distance between $p_2$ and $P'_2$, then the object is in translation. If the distance between $p_1$ and $p'_1$ is not equal to the distance between $p_2$ and $p'_2$, then the object is in rotation with maybe some translation.

To determine whether the object is in both translation and rotation, the same process used to determine whether the object is in rotation is performed for the object in $X_2$ and $X_3$ to find the center $c'(x_c\ y_c\ k)$ of the object's rotation in a subsequent frame. If $c(x_c\ y_c\ k)$ is the same element as $c'(x_c\ y_c\ k)$ then the object is in rotation only. If $c(x_c\ y_c\ k)$ is not the same element as $c'(x_c\ y_c\ k)$ then the object is in rotation and translation, and the translation is described by the line or vector from $c(x_c\ y_c\ k)$ to $c'(x_c\ y_c\ k)$.

As discussed above, the four points or elements on each object's outline are used to position the object in the reconstructed frames. The values for the rotation vector (r) and the translation vector (t) are used to move the object through the reconstructed frames at the destination transceiver.

To determine whether an object is spinning, at least two points, $p_1(x\ y\ k)$ and $p_2(X\ y\ k)$, are used to represent a color pattern on the object and the points are followed through the frames $X_1$, $X_2$, $X_3$, and $X_4$. In one embodiment, these two points are on opposite sides of the pattern. To determine whether an object is spinning, the object saved from the first frame $X_1$ is scanned for color patterns that may be followed to analyze the object's movements. An object may move as much as 17 pixels in any direction between frames, using the QCIF (176×144) frame size. The object is scanned for dramatic changes in color, such as places where the red, green, or blue values change more than 15% across the object, and the size of the area of change with respect to the size of the object (area/object size). If this ratio, calculated using pixels, is greater than ⅓, the object is scanned further to find a smaller area of change (⅕ or smaller, for example).

Once a desirable area of change is located, the color pattern area, and its orientation on the object's k plane, are located on the other frames $X_2$, $X_3$ and $X_4$. Four elements on the pattern area are then used to define the object's motion. Using two of the four elements ($p_1(x\ y\ k)$ and $p_2(x\ y\ k)$) on opposite sides of the chosen pattern, the pattern's motion in the object's outline may be defined. The two points on the object's pattern in frame $X_1$ are identified as $p_1(x\ y\ k)$ and $p_2(X\ y\ k)$, and the same two points on the object's pattern in frame $X_2$ are identified as $p'_1(x'\ y'\ k)$ and $p'_2(x'\ y'\ k)$. Similar to the translation determination of an object, the length of a line drawn between $p_1(x\ y\ k)$ and $p_2(x\ y\ k)$ is by definition the same as the length of a line drawn between $p'_1(x'\ y'\ k)$ and $p'_2(x'\ y'\ k)$.

If there is no rotation between frames $X_1$ and $X_2$, the distance between $p_1$ and $p'_1$, calculated as $\sqrt{(\Delta x)^2 + (\Delta y)^2}$ counting pixels, is equal to the distance between $p_2$ and $p'_2$, and the pattern is in the same position on the object in all frames $X_1$, $X_2$, $X_3$, and $X_4$. Thus, the object is not spinning. If rotation of the pattern is apparent between frames $X_1$ and $X_2$, the distance between $p_1$ and $p'_1$ is not equal to the distance between $p_2$ and $p'_2$, and the object is spinning.

B. Determination of One or More Motion Equations

An element or pixel in matrix or frame $X_N$ identified as being on an object may be defined in space as $x_{ij} = p(x\ y\ k)$, a three dimensional vector where $x=i$, $y=j$, and k is the object identifier. According to the element definition, a motion equation p' for an element or pixel may be defined as a function of a rotation vector (r), a beginning element vector (p), and a translation vector (t) as follows:

$$p' = r \times p + t \tag{14}$$

Where:

$$p' = \text{end element vector} \tag{15}$$

$$= \begin{bmatrix} x' \\ y' \end{bmatrix}$$

$$= \begin{bmatrix} x' = r_x \times x + \Delta x \\ y' = r_y \times y + \Delta y \end{bmatrix}$$

$$= p'(x'\ y'\ k)$$

$$r = \text{rotation vector} = \begin{bmatrix} r_x \\ r_y \end{bmatrix} \tag{16}$$

$$p = \text{beginning element vector} = \begin{bmatrix} x \\ y \end{bmatrix} = p(x\ y\ k) \tag{17}$$

$$t = \text{translation vector} = \begin{bmatrix} \Delta x \\ \Delta y \end{bmatrix} \tag{18}$$

The rotation vector may be further defined as follows $$r = \begin{bmatrix} r_x \\ r_y \end{bmatrix} = \begin{bmatrix} \frac{(x' - \Delta x)}{x} \\ \frac{(y' - \Delta y)}{y} \end{bmatrix} = \frac{p'}{(p + t)} \tag{19}$$

To find the center of rotation $c(x_c\ y_c\ k)$, a straight line is drawn in the object's plane between $p_1$ and $p'_1$, wherein the length of the line is determined as $\sqrt{(\Delta x)^2 + (\Delta y)^2}$, and the slope of the line is $\Delta y / \Delta x = \tan \theta$. A line is also drawn between $p_2$ and $p'_2$ in the same manner. Perpendicular bisecting lines are then drawn from the middle (length/2) of these lines, wherein the junction of the two perpendicular bisecting lines is the three dimensional center $c(x_c\ y_c\ k)$ of the object's rotation. A line drawn from this rotation center $c(x_c\ y_c\ k)$ to $p_1$ is equal in length to a line drawn from $c(x_c\ y_c\ k)$ to $p'_1$, and a line drawn from $c(x_c\ y_c\ k)$ to $p_2$ is equal in length to a line drawn from $c(x_c\ y_c\ k)$ to $p'_2$.

The rate of spin for the object may be determined using the rotation vector. The rate of spin provides information to place the object in the proper position in each intermediate frame of the video output. The rate of spin (R) for the object is defined as the magnitude of the rotation vector divided by the change in time:

$$R = \frac{|r|}{\Delta T} = \frac{\left(\sqrt{(r_x)^2 + (r_y)^2}\right)}{\Delta T} \tag{20}$$

If the rate of spin for an object is a constant, then the magnitude of the rotation vectors $|r_{12}|$, $|r_{23}|$, and $|r_{34}|$ calculated using the difference matrices $\Delta X_{12}$, $\Delta X_{23}$, and $\Delta X_{34}$ will provide approximately the same values. In the present embodiment, the change in time between frames $\Delta T_{12} = \Delta T_{23} = \Delta T_{34}$ is one second, and therefore $|r|/\Delta T = |r|/\sec$, and the distance to rotate is defined by $x' = r_x \times x$ and $y' = r_y * y$, and may be divided evenly by 30 to obtain each outputted video frame position.

If the rate of spin ($|r|/\Delta T$) for an object is not a constant, then the magnitude of the rotation vectors $|r_{12}|$, $|r_{23}|$, and $|r_{34}|$ calculated using the difference matrices $\Delta X_{12}$, $\Delta X_{23}$, and $\Delta X_{34}$ will not provide the same values ($|r_{12}| \neq |r_{23}| \neq |r_{34}|$), and the object is either speeding up or slowing down in its spinning. In the present embodiment, the change in time between frames of the difference matrices $\Delta T_{12} = \Delta T_{23} = \Delta T_{34}$ is one second, and therefore $|r_{12}|/\Delta T_{12} = |r_{12}|/\sec$, $|r_{23}|/\Delta T_{23} = |r_{23}|/\sec$, and $|r_{34}|/\Delta T_{34} = |r_{34}|/\sec$. The distance to rotate as defined by $x' = r_x * x$ and $y' = r_y * y$ cannot be divided evenly by 30 to obtain each frame position. To determine the movement of this object that does not have a constant rate of spin, the system determines the acceleration or deceleration of the spinning object. The determination of the rotation vector for the accelerating spinning object is discussed in further detail hereinafter below with respect to the rotation element of the acceleration vector for a moving object.

The motion equations for an object include an acceleration or deceleration component to account for the speeding up or slowing down of the object's motion. If an object's acceleration is linear, then the object is speeding up or slowing down at a definable rate as it goes through the frames. An object's linear acceleration may be calculated using the object's image that has been stored from $X_1$, $X_2$, $X_3$ and $X_4$.

An acceleration vector a has both a translation and a rotation component. To determine the translation component, the linear distance $|t|$ an element moves from p and p', as discussed above, is calculated as $\sqrt{(\Delta x)^2 + (\Delta y)^2}$. If the object is accelerating or decelerating linearly then the following relationship is true:

$$|t_{12} - t_{23}| = |t_{23} - t_{34}| \neq 0 \quad (21)$$

If the object is accelerating non linearly, then the following relationship is true:

$$|t_{12} - t_{23}| \neq |t_{23} - t_{34}| \neq 0 \quad (22)$$

In the present example, non-linear acceleration or deceleration are not considered. The translation component of the linear acceleration vector $a_{t14}$ is defined as follows for linear acceleration, where the acceleration is taken over a two second time period:

$$a_{t14} = (t_{12} - t_{23}) + (t_{23} - t_{34}) = a_{t13} + a_{t24} \quad (23)$$

If the object is accelerating or decelerating linearly then $a_{t13} = a_{t24}$ and a new vector $t_c$ is defined as follows and is a constant for all frames:

$$t_c = t_{12} - t_{23} = t_{23} - t_{34} \quad (24)$$

Thus, the translation vector t may be redefined as follows using the acceleration vector:

$$t = a_{t13} \times t_c = \begin{bmatrix} a_{tx} \\ a_{ty} \end{bmatrix} \times \begin{bmatrix} t_{cx} \\ t_{cy} \end{bmatrix} = \begin{bmatrix} a_{tx} \times t_{cx} \\ a_{ty} \times t_{cy} \end{bmatrix} \quad (25)$$

In the present example, one frame is sent every second and the acceleration calculations above using the distance components calculate acceleration over a period of two seconds, then the rate of acceleration per frame is as follows:

$$\frac{|a_{13}|}{60 \sec} = \frac{|a_{24}|}{60 \sec} \quad (26)$$

The (x, y) components for the acceleration are determined as follows:

$$a_{t13} = t_{12} - t_{23} = \begin{bmatrix} a_{tx} \\ a_{ty} \end{bmatrix} = \begin{bmatrix} \Delta x_{12} - \Delta x_{23} \\ \Delta y_{12} - \Delta y_{23} \end{bmatrix} \quad (27)$$

The acceleration multiplier $a_t$ for the object in each new frame is thus:

$$a_t = \begin{bmatrix} \dfrac{|a_{tx}|}{60} \\ \dfrac{|a_{ty}|}{60} \end{bmatrix} \quad (28)$$

Furthermore, the translation vector t for each newly created frame is determined as follows:

$$t = \begin{bmatrix} \dfrac{a_{tx} \times t_{cx}}{60} \\ \dfrac{a_{ty} \times t_{cy}}{60} \end{bmatrix} \quad (29)$$

The next determination is for the rotation component of the acceleration vector. If the object is accelerating or decelerating linearly then the following relationship is true:

$$|r_{12} - t_{23}| = |r_{23} - r_{34}| \neq 0 \quad (30)$$

If the object is accelerating non linearly, then the following relationship is true:

$$|r_{12} - r_{23}| \neq |r_{23} \neq r_{34}| 0 \quad (31)$$

In the present example, non-linear acceleration or deceleration are not considered. The rotational component of the linear acceleration vector $a_{r14}$ is defined as follows for linear acceleration, where the acceleration is taken over a two second time period:

$$a_{r14} = (r_{12} - r_{23}) + (r_{23} - r_{34}) = a_{r13} + a_{r24} \quad (32)$$

If the object is accelerating or decelerating linearly then $a_{r13} = a_{r24}$ and a new vector $r_c$ is defined as follows and is a constant for all frames:

$$r_c = r_{23} - r_{23} = r_{23} r_{34} \quad (33)$$

Thus, the translation vector r may be redefined as follows using the acceleration vector:

$$r = a_{r13} \times r_c = \begin{bmatrix} a_{rx} \\ a_{ry} \end{bmatrix} \times \begin{bmatrix} r_{cx} \\ r_{cy} \end{bmatrix} = \begin{bmatrix} a_{rx} \times r_{cx} \\ a_{ry} \times r_{cy} \end{bmatrix} \quad (34)$$

In the present example, one frame is sent every second and the acceleration calculations above using the distance components calculate acceleration over a period of two seconds, then the rate of acceleration per frame is as follows:

$$\frac{|a_{13}|}{60 \text{ sec}} = \frac{|a_{24}|}{60 \text{ sec}} \quad (35)$$

The (x, y) components for the acceleration are determined as follows:

$$a_{r13} = r_{12} - r_{23} = \begin{bmatrix} a_{rx} \\ a_{ry} \end{bmatrix} = \begin{bmatrix} \frac{(x_2 - \Delta x_{12})}{x_1} - \frac{(x_3 - \Delta x_{23})}{x_2} \\ \frac{(y_2 - \Delta y_{12})}{y_1} - \frac{(y_3 - \Delta y_{23})}{y_2} \end{bmatrix} \quad (36)$$

The acceleration multiplier $a_r$ for the object in each new frame is thus:

$$a_r = \begin{bmatrix} \frac{|a_{rx}|}{60} \\ \frac{|a_{ry}|}{60} \end{bmatrix} \quad (37)$$

Furthermore, the translation vector t for each newly created frame is determined as follows:

$$r = \begin{bmatrix} \frac{a_{rx} \times r_{cx}}{60} \\ \frac{a_{ry} \times r_{cy}}{60} \end{bmatrix} \quad (38)$$

Thus, having the translation and rotation vectors determined incorporating acceleration of the object, the end element vector p' for each newly created frame is defined as follows:

$$p'(x'y'k) = \begin{bmatrix} x' \\ y' \end{bmatrix} = \begin{bmatrix} \left(\frac{a_{rx} \times r_{cx} \times x}{60}\right) + \left(\frac{a_{tx} \times t_{cx}}{60}\right) \\ \left(\frac{a_{ry} \times r_{cy} \times y}{60}\right) + \left(\frac{a_{ty} \times t_{cy}}{60}\right) \end{bmatrix} \quad (39)$$

Thus, if an object is moving through frames $X_1$, $X_2$, $X_3$ and $X_4$, four points on the outline of the object, located by comparing the difference frames $\Delta X_{12}$, $\Delta X_{23}$, and $\Delta X_{34}$ with the object in $X_1$, $X_2$, $X_3$ and $X_4$, are used to move the image of the object across the newly created background frames for video output. This movement is defined by the motion equation and the four points defined on the outline of the object.

For an object undergoing only linear movement, the position of a point $p_n'(x_n' y_n' k)$ on an object in a reconstructed intermediate frame number n is determined according to the following equation, where x and y are the starting coordinates of the point on the object in a first transmitted frame, and n is an integer from 1 to 29 corresponding to the intermediate frame being created (e.g., n=1 for $1^{st}$ intermediate frame):

$$p_n'(x_n' y_n' k) = \begin{bmatrix} x' \\ y' \end{bmatrix} = \begin{bmatrix} \left(\frac{a_{rx} \times r_{cx} \times x}{60}\right) + \left(\frac{a_{tx} \times t_{cx}}{60}\right) \times n \\ \left(\frac{a_{ry} \times r_{cy} \times y}{60}\right) + \left(\frac{a_{ty} \times t_{cy}}{60}\right) \times n \end{bmatrix} \quad (40)$$

If an object is spinning inside its defined outline in a frame X, four points on a pattern located on the object are used to rotate the image of the object to be placed on the newly created background frames for video output, wherein the spinning or rotation of the object is defined by the rotation vector r. The denominator value "60" reflects the number of frames to be created between Frame 1 and Frame 3. Thus, the denominator value "60" may be changed depending on the number of frames to be created between transmitted frames, e.g., Frame 1 and Frame 3.

VIII. Example of Motion Equation Determination for Moving Ball

Figure 10A:
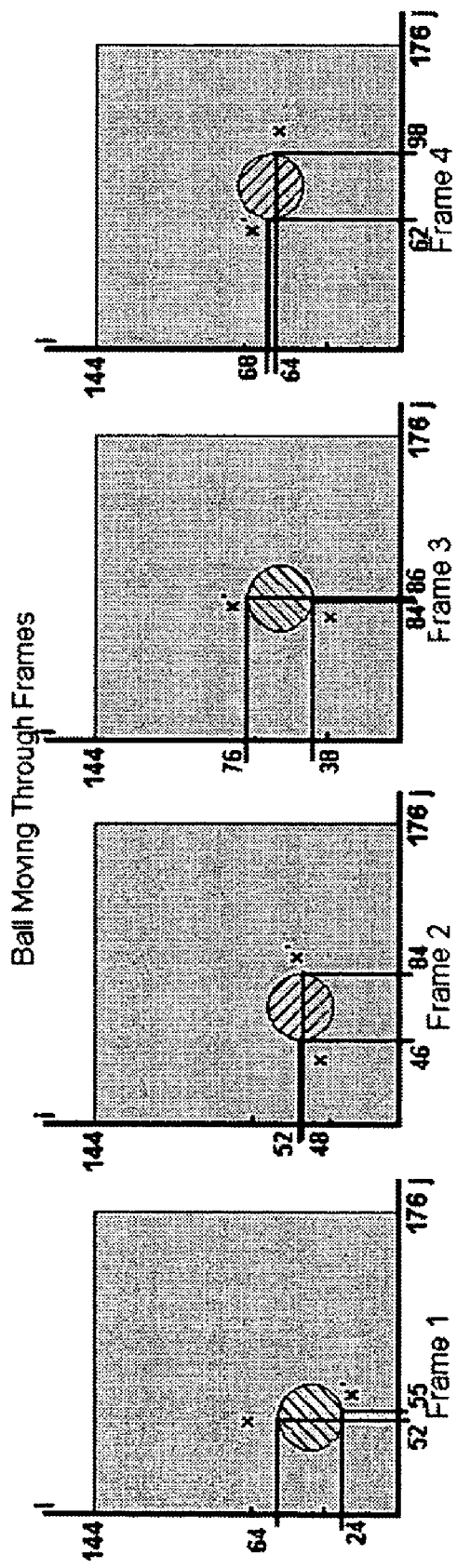
FIG. 10A is a more detailed illustration of the four video frames of FIG. 9A identifying points for use in determining the motion equation for the ball.
Figure 10B:
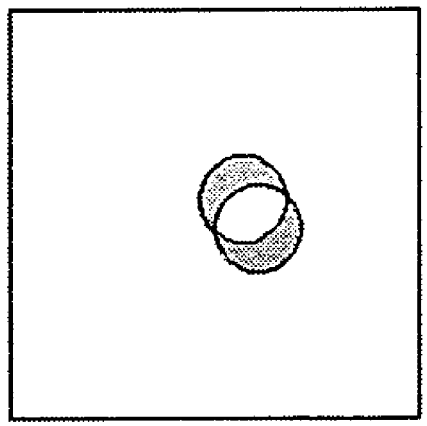
FIG. 10B is a more detailed illustration of the frame representations of FIG. 9B identifying points for use in determining the motion equation for the ball.
Figure 10B:
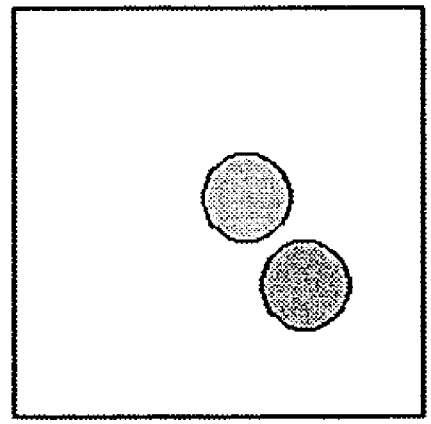
Figure 10B:
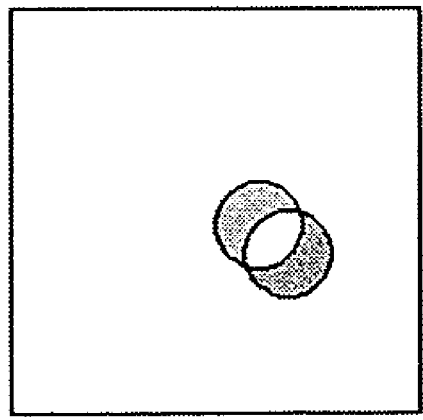
Figure 10B:
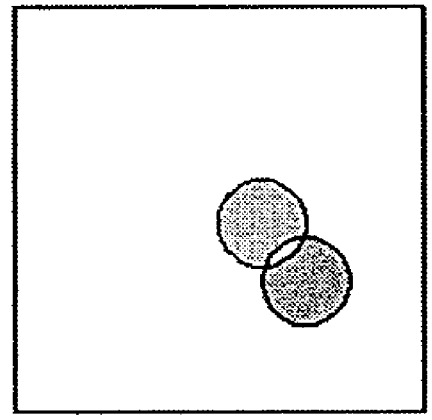
Figure 10B:
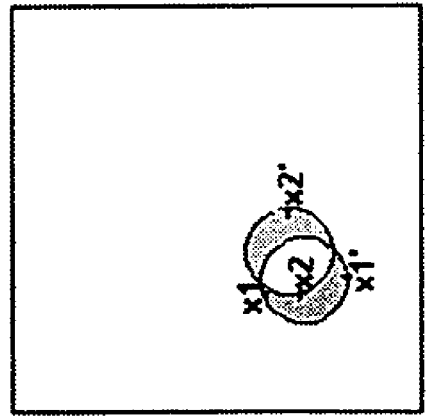
Figure 11A:
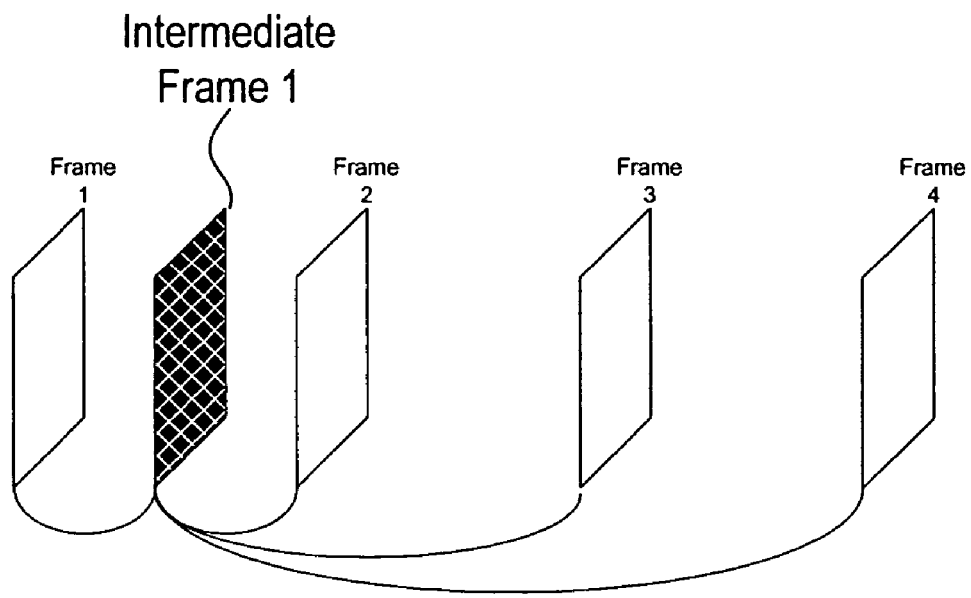
FIGS. 11A-11D illustrate one embodiment of a method of reconstructing video frames for video stream output at the video communication destination.
Figure 11B:
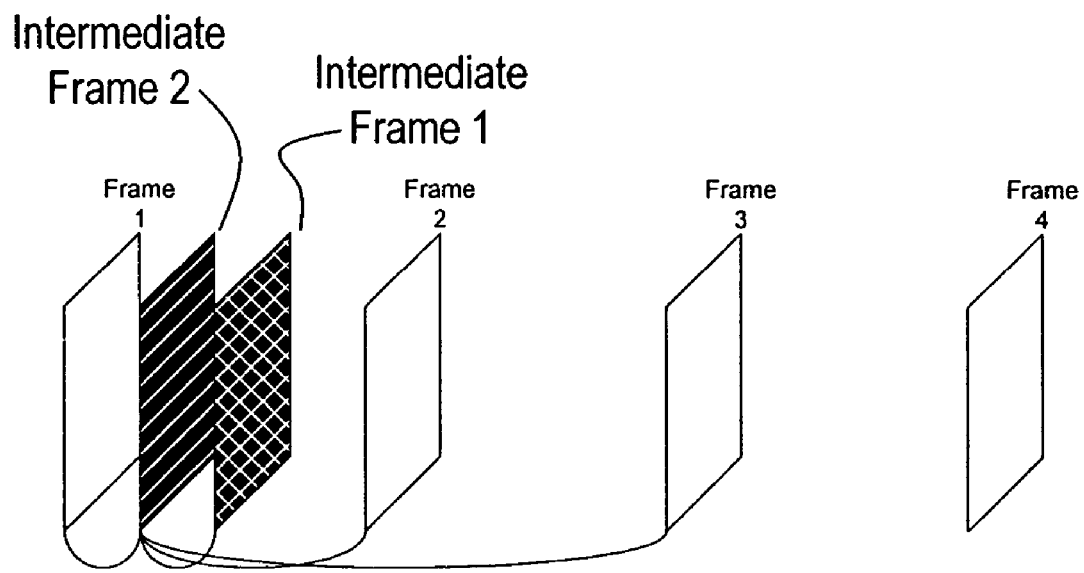
Figure 11C:
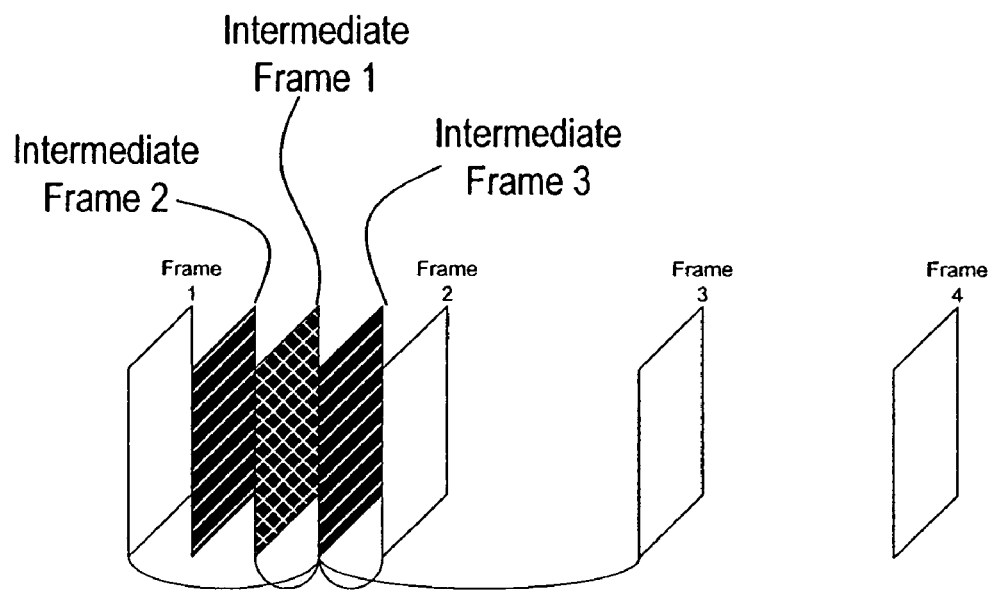
Figure 11D:
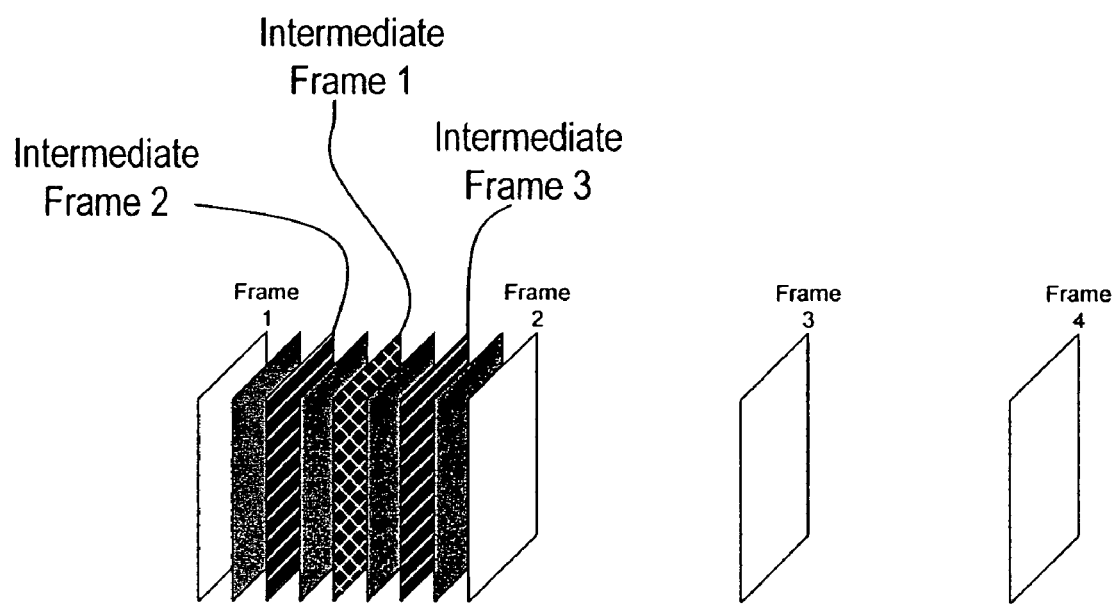

FIG. 10A is a more detailed illustration of the four video frames of FIG. 9A, and FIG. 10B is a more detailed illustration of the frame representations of FIG. 9B, wherein FIGS. 10A-B illustrate identifying points x and x' for use in determining the motion equation for the ball 70.

The motion equation p' for point x on the ball 70 is defined as a function of a rotation vector (r), a beginning element vector (p), and a translation vector (t) as follows:

$$p' = r \times p + t \quad (14)$$

In the frame matrix for Frame 1 as illustrated in FIG. 10A, point x is located at element $x_{52,64}$ and in the frame matrix for Frame 2, point x is located at element $x_{46,52}$. As previously discussed in Section VI, there is only one object for this example and therefore the k value for the object is 1. Using the element information for point x in the frame matrices for Frame and Frame 2, the motion equation and corresponding vectors are determined as follows:

$$p = \text{beginning element vector} = \begin{bmatrix} 52 \\ 64 \end{bmatrix} = p(52, 64, 1) \quad (17)$$

$$p' = \text{end element vector} = \begin{bmatrix} 46 \\ 52 \end{bmatrix} = \begin{bmatrix} 46 = r_x \times 52 + (52 - 46) \\ 52 = r_y \times 64 + (64 - 52) \end{bmatrix} \quad (15)$$

$$= p'(46, 52, 1)$$

$$t = \text{translation vector} = \begin{bmatrix} \Delta x \\ \Delta y \end{bmatrix} = \begin{bmatrix} (52 - 46) \\ (64 - 52) \end{bmatrix} = \begin{bmatrix} 6 \\ 12 \end{bmatrix} \quad (18)$$

$$r = \text{rotation vector} = \begin{bmatrix} r_x \\ r_y \end{bmatrix} = \begin{bmatrix} \frac{(x' - \Delta x)}{x} \\ \frac{(y' - \Delta y)}{y} \end{bmatrix} \quad (16)$$

$$= \begin{bmatrix} (46 - 6)/52 \\ (52 - 12)/64 \end{bmatrix} = \begin{bmatrix} 40 \\ 40 \end{bmatrix}$$

The motion equations for an object include an acceleration or deceleration component to account for the speeding up or slowing down of the object's motion. If an object's acceleration is linear, then the object is speeding up or slowing down at a definable rate as it goes through the frames. An object's linear acceleration may be calculated using the object's image that has been stored for frame matrices $X_1$, $X_2$, $X_3$ and $X_4$.

For point x on the ball 70, the linear distance |t| the element moves between p and p', as discussed above, is calculated as $\sqrt{(\Delta x)^2 + (\Delta y)^2}$. Thus, the following linear distances can be calculated, where point x is located at element $x_{84,38}$ in the frame matrix for Frame 3, and element $x_{98,64}$ in the frame matrix for Frame 4:

$|t_{12}|=\sqrt{(52-46)^2+(64-52)^2}=\sqrt{(6)^2+(12)^2}=13.4$ $|t_{23}|=\sqrt{(46-84)^2+(52-38)^2}=\sqrt{(38)^2+(14)^2}=40.5$ $|t_{34}|=\sqrt{(84-98)^2+(38-64)^2}=\sqrt{(-14)^2+(-26)^2}=29.5$ The translation component of the linear acceleration vector $a_{t14}$ is defined as follows for linear acceleration, where the acceleration is taken over a two second time period:

$$a_{r14}=(t_{12}-t_{23})+(t_{23}-t_{34})=a_{t13}+a_{t24} \quad (23)$$

Where $$t_{12} = \begin{bmatrix} 6 \\ 12 \end{bmatrix}, \quad t_{23} = \begin{bmatrix} -38 \\ 14 \end{bmatrix}, \quad \text{and} \quad t_{34} = \begin{bmatrix} -14 \\ 26 \end{bmatrix},$$

and the acceleration vectors $a_{t13}$ and $a_{t14}$ are determined as follows:

$$a_{t13} = t_{12} - t_{23} = \begin{bmatrix} 44 \\ 2 \end{bmatrix} \text{ and } a_{t24} = t_{23} - t_{34} = \begin{bmatrix} -24 \\ -12 \end{bmatrix} \quad (27)$$

In this example, the destination transceiver 26 is only considering the linear movement of the ball 70. Therefore, the position $p_n'(x_n' y_n' k)$ of the point x on the ball as it appears in a reconstructed intermediate frame is determined according to the following equation, where, to find the position of the point x in the fifteenth frame, for example, the variable n is replaced with 15:

$$p_n'(x_n'y_n'k) = \begin{bmatrix} x' \\ y' \end{bmatrix} = \begin{bmatrix} \left(\frac{a_{rx} \times r_{cx} \times x}{60}\right) + \left(\frac{a_{tx} \times t_{cx}}{60}\right) \times n \\ \left(\frac{a_{ry} \times r_{cy} \times y}{60}\right) + \left(\frac{a_{ty} \times t_{cy}}{60}\right) \times n \end{bmatrix} \quad (40)$$

IX. Stationary Changing Objects

If an object has no motion associated with it, that is the object is in the same position in the difference matrices $\Delta X_{12}$, $\Delta X_{13}$, and $\Delta X_{14}$), the object is identified as a stationary changing object. The rate of change of the object may be defined as $\Delta X/\Delta T$. The object's border elements (outline) are used to find the physical object in the frames $X_1$, $X_2$, $X_3$ and $X_4$. The object's rate of change may be determined as follows using the difference matrices and associated changes in time:

$$\frac{\Delta X}{\Delta T} = \frac{\left(\frac{\Delta X_{12}}{\Delta T_{12}} + \frac{\Delta X_{23}}{\Delta T_{23}} + \frac{\Delta X_{34}}{\Delta T_{34}} + \frac{\Delta X_{13}}{\Delta T_{13}} + \frac{\Delta X_{14}}{\Delta T_{14}}\right)}{5} \quad (40)$$

A stationary changing object's border, or outline, is made up of non-moving elements of like rate of change ($\Delta X/\Delta T$), wherein an element on the border of a stationary object has at least two adjacent elements of unlike rate of change. By identifying the elements having adjacent elements of unlike rate of change, the destination transceiver 26 forms a connecting border outlining the object using the identified border elements.

In one embodiment, as discussed above, an eight bit pixel ($x_{ij}$) is used in a QCIF frame having a size of 144×176 pixels.

Each pixel or element of an image or frame represents a color, and has a canonical minimum value and a canonical maximum value. In the defined space of each frame, anything that is not dynamically changing is ignored by the system. The system evaluates and defines colorization changes within the defined objects, keeping the information for each object separate and linked to their associated frames.

The variables defined for use in the system are pixel color, pixel frame positioning, and frame differences over time. The goal of the system is to understand what the image of an object in frames $X_1$, $X_2$, $X_3$ and $X_4$ is doing in terms of color as it goes through these frames.

As will be appreciated by one skilled in the art, chroma and luma may be used instead of the red, green, and blue (RGB) values to characterize the pixel values. In one embodiment, YCrCb or YUV represents each color by a luma component "Y" and two components of chroma Cr (or V) and Cb (or U). The luma component is related to "brightness" or "luminance," and the chroma components make up a quantity related to "hue." These components are defined rigorously in ITU-R BT.601-4 (also known as Rec. 601 and formerly CCIR 601). When referring to the chroma components, it may be advantageous to use Cr and Cb rather than V and U because the analog NTSC video specification ANSI/SMPTE 170M uses V and U with a slightly different meaning.

In one example, the RGB components of a pixel have values in the range of 0 to 255, and the conversion equations for the chroma and luma components YCrCb or YUV are as follows:

$Y=0.257r+0.504g+0.098b+16$ $Cr$ or $V=0.439r-0.368g-0.071b+128$ $Cb$ or $U=-0.148r-0.291g+0.439b+128$

As an object moves through a series of video frames it may go through a pattern of color and/or shade changes. To best understand the behavior of an object, all 30 frames per second would need to be captured and evaluated. However, the system only transmits one out of every thirty frames, and the destination transceiver 26 may query the source transceiver 24 regarding information or behavior of an object that is not clear from the received frames.

X. Frame Reconstruction

FIGS. 12A-D illustrate one embodiment of a method of reconstructing a video stream at the destination transceiver 26 using transmitted frames Frame 1, Frame 2, Frame 3, and Frame 4 as illustrated in FIG. 3, and the background and object information determined above. First, all stationary background information received from the source transceiver 24 is shifted evenly across a frame buffer between transmitted frames Frame 1, Frame 2, Frame 3, and Frame 4, thus creating the background for the intermediate frames from Frame 1 through Frame 4. Following creation of the background, development of the full intermediate frames is initiated where object information from the destination transceiver 26 is used to position objects on to the background frames in a working buffer at the destination transceiver 26. The frame buffer is an area in memory where the image frames are being reconstructed and is the buffer that will be shifted out (FIFO) to the video display 34 for display. The frame buffer is part of the working buffer, and in one embodiment, the working buffer is the memory where calculations, objects, object outlines, location information, etc. is stored and used.

As previously discussed, a four-frame comparison method may be used to define and locate objects in intermediate frames. As illustrated in FIG. 12A, information from Frame 1, Frame 2, Frame 3, and Frame 4 is used to identify and position objects in the intermediate frame between Frame 1 and Frame 2, which will be referred to hereinafter as Intermediate Frame 1. Similarly, as illustrated in FIG. 12B, information from Frame 1, Intermediate Frame 1, Frame 2, and Frame 3 is used to identify and position objects in the intermediate frame between Frame 1 and Intermediate Frame 1, which will be referred to hereinafter as Intermediate Frame 2. Next, as illustrated in FIG. 12C, information from Frame 1, Intermediate Frame 1, Frame 2, and Frame 3 is used to identify and position objects in the intermediate frame between Intermediate Frame 1 and Frame 2, which will be referred to hereinafter as Intermediate Frame 3.

More particularly, the motion equations determined according to the description in section VII are used in conjunction with time information to determine the location of the chosen four points on an object as they are located in an intermediate frame. For example, if an object it determined to be moving linearly between Frame 1 and Frame 2, and the time between Frame 1 and Frame 2 is 30 seconds, then the position of the object in Intermediate Frame 1 is determined by dividing the distance traveled between Frame 1 and Frame 2 in half, or using the knowledge that for Intermediate Frame 1, fifteen (15) seconds have passed since the object was located as identified in Frame 1.

The system continues to identify and position objects on the intermediate frames between Frame 1, Intermediate Frame 1, Intermediate Frame 2, Intermediate Frame 3, and Frame 2 until all 29 frames between Frame 1 and Frame 2 are completed as illustrated in FIG. 12D. Once the background and objects have been positioned on a sequence of 29 frames following one of the transmitted frames, the frame sequence, including transmitted frames Frame 1 and Frame 2, is transmitted to the frame buffer for display on the display 34.

Following completion of the sequence of intermediate frames between Frame 1 and Frame 2, a new transmitted frame is used as Frame 4 (frame matrix $X_4$) to reconstruct the intermediate frames between old Frame 2 and Frame 3 in the same manner the intermediate frames between old Frame 1 and Frame 2 were constructed. Thus, old Frame 2 is now Frame 1, old Frame 3 is now used as Frame 2, and old Frame 4 is now used as Frame 3 to reconstruct the next sequence of frames for display on the display 34. The existing background frames created are verified and validated, wherein if something has changed dramatically, the destination transceiver 26 queries the source transceiver 24 to verify the change. If the change is not validated by the source transceiver 24, then the destination transceiver either requests a new frame, or, if there is a transmission problem, the destination transceiver 26 assumes the new frame is bad and uses the background information already determined. Following verification and validation of the background of the intermediate frames, the objects are positioned on the intermediate frames between new Frame 1 and new Frame 2 in the working buffer. Once all of the intermediate frames have been reconstructed in the working buffer, new Frame 1, the reconstructed intermediate frames, and new Frame 2 are transmitted to the display 34. This process of reconstruction of intermediate frames and subsequent transmission to the display 34 is repeated for the remainder of the sequence of transmitted frames received at the destination transceiver 26 such that the frames displayed at the display 34 is the continuous video stream 110 illustrated in FIG. 4, and consists of 30 frames per second.

Figure 12:
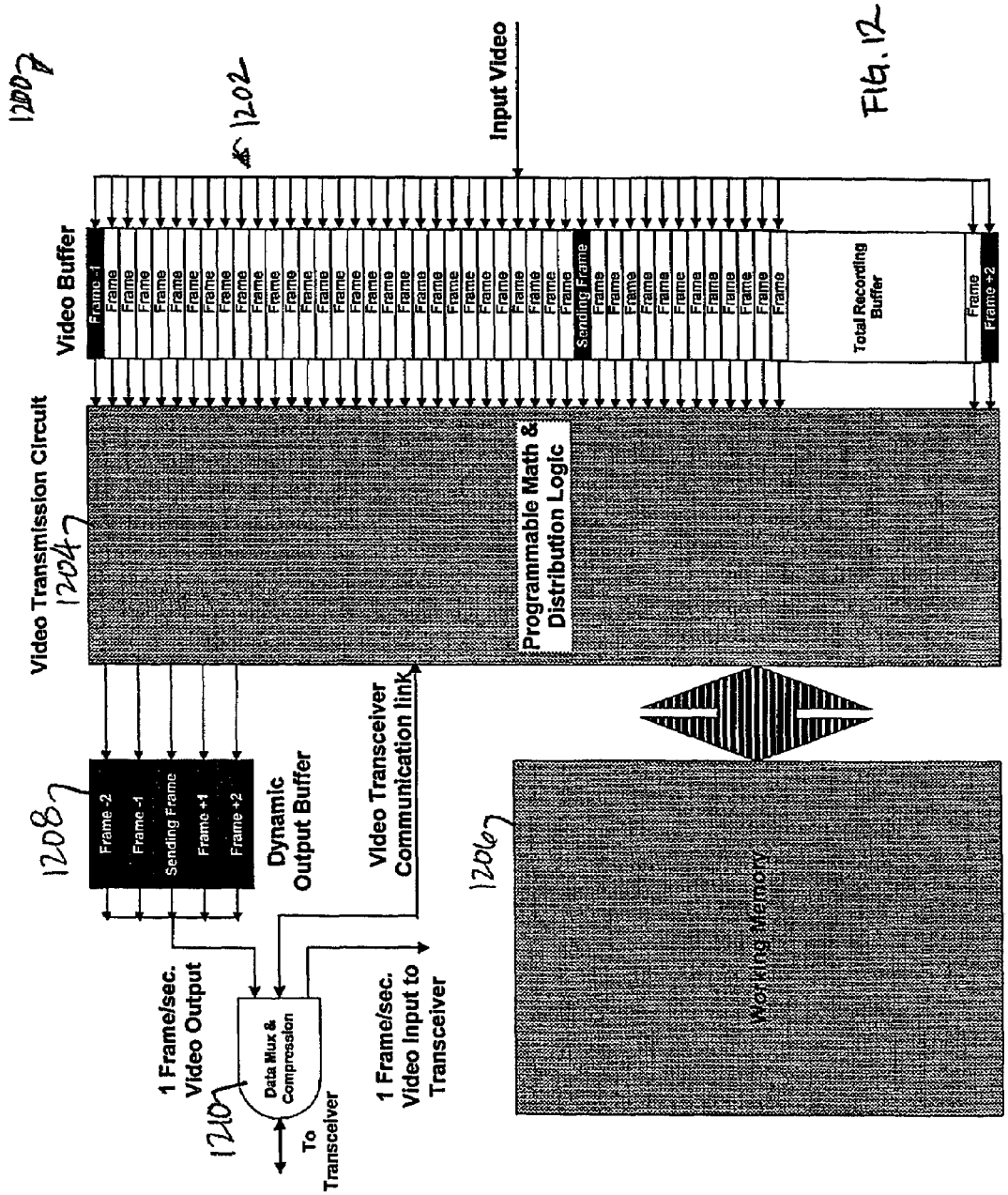
FIG. 12 is a block diagram of one embodiment of a source transceiver circuit.

An exemplary source transceiver circuit 1200 is illustrated in the block diagram of FIG. 12. The source transceiver circuit 1200 comprises a video buffer 1202 configured to receive a video stream from the video source 22. The video buffer is coupled to programmable math and distribution logic circuitry 1204, which is coupled to a working memory 1206. The programmable math and distribution logic circuitry 1204 is coupled to a dynamic output buffer 1208, which outputs one frame per second to a data multiplexer and compression circuit 1210. The data multiplexer and compression circuit 1210 is coupled to transceiver circuitry, which can include both transmit circuitry and receive circuitry. The data multiplexer and compression circuitry 1210 is also coupled to the programmable math and distribution logic circuitry 1204 such that the source transceiver 24 can retrieve frame information in response to a request from the destination transceiver 26.

Figure 13:
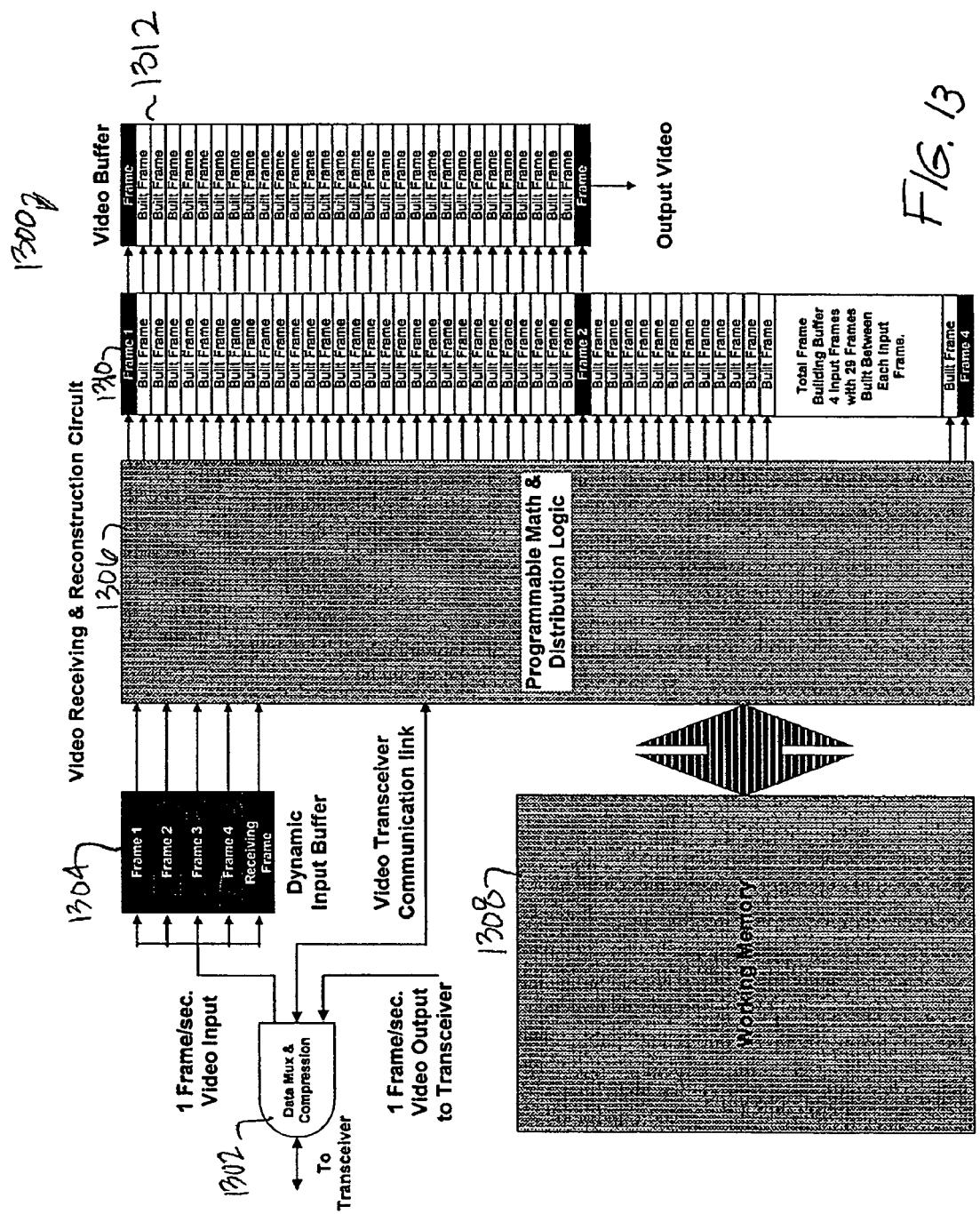
FIG. 13 is a block diagram of one embodiment of a destination transceiver circuit.

Similar to the source transceiver circuit 1200, an exemplary destination transceiver circuit 1300 is illustrated in FIG. 13. The destination transceiver circuit 1300 comprises a data multiplexer and compression circuit 1302 configured to receive the one frame per second video input from the source transceiver 24. A dynamic input buffer 1304 is coupled to the data multiplexer and compression circuit 1302 and is configured to shift the one frame per second into programmable math and distribution logic circuitry 1306. The programmable math and distribution logic circuitry 1306 is coupled to a working memory 1308 and configured to reconstruct or build intermediate frames between the frames at the dynamic input buffer 1304. The math and distribution logic circuitry 1306 reconstructs or builds the intermediate frames in a frame building buffer 1310, which is coupled to a video buffer 1312 configured to shift out 30 frames per second to the display 34.

The programmable math and distribution logic circuitry 1306 may be embedded in a processor that is configured to identify a plurality of points having at least one related characteristic in at least one of the first and second frames. The programmable math and distribution logic circuitry 1306 may also be configured to determine if at least one of the plurality of points has changed its position between the first frame and the second frame. The programmable math and distribution logic circuitry 1306 may be configured to associate the at least one of the plurality of points that has changed its position with at least a first pixel in the first frame and a second pixel in the second frame, and further configured to determine a relationship between a position of the first pixel and a position of the second pixel. The programmable math and distribution logic circuitry 1306 may be configured to determine in the at least one intermediate frame the position of the at least one of the plurality of points that has changed its position based at least in part on the relationship between the positions of the first and second pixel. The programmable math and distribution logic circuitry 1306 may be configured to identify a plurality of points that remained substantially without motion between the first and second frames. The programmable math and distribution logic circuitry 1306 may be configured to define position of pixels of substantially the entire intermediate frames comprising points in motion and substantially stationary points. In determining pixel information for stationary objects in intermediate frames, the programmable math and distribution logic circuitry 1306 is configured to identify in the intermediate frame pixel information for the plurality of points that remained unchanged based at least on one of (a) pixel information in the first frame, (b) pixel information in the second frame, (c) pixel information about the intermediate frame provided from a source of the first and second frames, and (d) averaging pixel information of the first and second frames. As indicated above, the programmable math and distribution logic circuitry 1204 and 1306 may be implemented into or in association with a source telephone and destination telephones, respectively. Such telephones may function in a wired (e.g., POTS) or wireless (e.g., cellular or mobile) telephone network. The invention is not limited to telephone network implementations only, but the invention may be similarly implemented in any wired or wireless communication network(s) that sends and/or receives images or video information.

The foregoing description details certain embodiments of the invention. It will be appreciated, however, that the invention can be practiced in many ways. For example, several components such as the programmable math and distribution logic circuitry 1306 and 1204 may be implemented in a single or multiple processors, dedicated hardware circuitry, software modules executed in a device such as a telephone or a computer, and many other implementations known in the art. The scope of the invention should therefore be construed in accordance with the appended claims and any equivalents thereof.

What is claimed is:

1. A method of constructing at least one intermediate frame of an image between first and second frames, the method comprising:
   identifying a plurality of points having at least one related characteristic in at least one of the first and second frames based, at least in part, on numerical differences between the first and second frames;
   determining if at least one of the plurality of points has changed its position between the first frame and the second frame;
   associating the at least one of the plurality of points that has changed its position with at least a first pixel in the first frame and a second pixel in the second frame;
   determining a relationship between a position of the first pixel and a position of the second pixel; and
   defining a position of at least one intermediate pixel in the at least one intermediate frame.

2. The method of claim 1, further comprising determining in the at least one intermediate frame the position of the at least one of the plurality of points that has changed its position based at least in part on the relationship between the positions of the first and second pixel.

3. The method of claim 2, further comprising identifying a plurality of points that remained substantially without motion between the first and second frames.

4. The method of claim 3, further comprising defining position of pixels of substantially the entire intermediate frames comprising points in motion and substantially stationary points.

5. The method of claim 3, further comprising identifying in the intermediate frame pixel information for the plurality of points that remained unchanged based at least on one of (a) pixel information in the first frame, (b) pixel information in the second frame, (c) pixel information about the intermediate frame provided from a source of the first and second frames, and (d) averaging pixel information of the first and second frames.

6. The method of claim 5, wherein the pixel information for the plurality of points that remained unchanged comprises at least one of color and gray scale values.

7. The method of claim 6, wherein the pixel information for one of the plurality of points comprises substantially the same color information as that of at least one pixel located in a position in the first frame that is associated with substantially the same position of the one of the plurality of points in the first frame.

8. The method of claim 1, wherein determining the relationship between the position of the first and second pixels comprises deriving at least one coefficient in a motion equation.

9. The method of claim 1, wherein the motion equation determines position of the at least one of the plurality of points undergoing at least one of spinning, rotational, and translational motion.

10. The method of claim 9, wherein the position of the first and second pixels are identified at least in part by x and y coordinates.

11. The method of claim 1, wherein identifying the plurality of points having at least one related characteristic comprise defining an object.

12. The method of claim 11, wherein defining an object comprises defining at least a portion of a physical object in the image as viewed by an eye of an observer.

13. The method of claim 1, wherein identifying the plurality of points having at least one related characteristic comprises determining whether the plurality of points experience at least one of spinning, rotational, and translational motion.

14. The method of claim 1, wherein determining if at least one of the plurality of points has changed its position comprises identifying a point having a non-zero difference between a pixel position in the first frame and a substantially same position pixel in the second frame.

15. The method of claim 14, further comprising identifying a plurality of objects in the first and second frames.

16. The method of claim 1, further comprising transmitting the first and second frames from a transmitter to a receiver.

17. The method of claim 1, further comprising selectively requesting a source transmitter to communicate information about at least one pixel in the intermediate frame.

18. The method of claim 1, wherein determining the relationship between a position of the first pixel and a position of the second pixel comprises at least in part identifying non-zero differences between color or gray scale information of the first pixel and a third pixel located at substantially the same position in the second frame.

19. The method of claim 1, further comprising communicating at least the first and second frames from a source telephone to a destination telephone via a wired or wireless telephone network.

20. The method of claim 1, wherein the numerical differences comprise differences between numerical values relating to color information associated with a plurality of pixels in the first frame and in the second frame.

21. A system for constructing at least one intermediate frame of an image between first and second frames, the system comprising:
   an identifier circuit configured to identify a plurality of points having at least one related characteristic in at least one of the first and second frames based, at least in part, on numerical differences between the first and second frames;
   a compare circuit configured to determine if at least one of the plurality of points has changed its position between the first frame and the second frame; and
   a processing circuit configured to associate the at least one of the plurality of points that has changed its position with at least a first pixel in the first frame and a second pixel in the second frame, and further configured to determine a relationship between a position of the first pixel and a position of the second pixel and to define a position of at least one intermediate pixel in the at least one intermediate frame.

22. The system of claim 21, wherein the processing circuit is configured to determine in the at least one intermediate frame the position of the at least one of the plurality of points that has changed its position based at least in part on the relationship between the positions of the first and second pixel.

23. The system of claim 22, wherein the identifier circuit is configured to identify a plurality of points that remained substantially without motion between the first and second frames.

24. The system of claim 23, wherein the processing circuit is configured to define position of pixels of substantially the entire intermediate frames comprising points in motion and substantially stationary points.

25. The system of claim 23, wherein the processing circuit is configured to identify in the intermediate frame pixel information for the plurality of points that remained unchanged based at least on one of (a) pixel information in the first frame, (b) pixel information in the second frame, (c) pixel information about the intermediate frame provided from a source of the first and second frames, and (d) averaging pixel information of the first and second frames.

26. The system of claim 25, wherein the pixel information for the plurality of points that remained unchanged comprises at least one of color and gray scale values.

27. The system of claim 26, wherein the pixel information for one of the plurality of points comprises substantially the same color information as that of at least one pixel located in a position in the first frame that is associated with substantially the same position of the one of the plurality of points in the first frame.

28. The system of claim 21, wherein the processing circuit is configured to derive at least one coefficient in a motion equation.

29. The system of claim 21, wherein the motion equation determines position of the at least one of the plurality of points undergoing at least one of spinning, rotational, and translational motion.

30. The system of claim 29, wherein the position of the first and second pixels are identified at least in part by x and y coordinates.

31. The system of claim 21, wherein the identifier circuit is configured to define points of an object.

32. The system of claim 31, wherein the identifier circuit defines at least a portion of a physical object in the image as viewed by an eye of an observer.

33. The system of claim 21, wherein the identifier circuit determines whether the plurality of points experience at least one of spinning, rotational, and translational motion.

34. The system of claim 21, wherein the compare circuit is configured to identify a point having a non-zero difference between a pixel position in the first frame and a substantially same position pixel in the second frame.

35. The system of claim 34, wherein the identifier circuit is configured to identify a plurality of objects in the first and second frames.

36. The system of claim 21, further comprising a transmitter configured to send the first and second frames to a receiver.

37. The system of claim 21, wherein the processing circuit is configured to selectively request a source transmitter to send information about at least one pixel in the intermediate frame.

38. The system of claim 21, wherein the processing circuit is configured to identify non-zero differences between color or gray scale information of the first pixel and a third pixel located at substantially the same position in the second frame.

39. The system of claim 21, further comprising a source telephone configured to send at least the first and second frames to a destination telephone via a wired or wireless telephone network.

40. The system of claim 21, wherein a processor comprises the identifier, compare, and processing circuits.

* * * * *